(12) United States Patent
Bush et al.

(10) Patent No.: US 6,995,357 B2
(45) Date of Patent: Feb. 7, 2006

(54) DEVICE FOR DETERMINING POSITION AND MOVEMENT OF SCANNING LASER BEAM

(75) Inventors: Craig P. Bush, Lexington, KY (US); Roger S. Cannon, Lexington, KY (US); Martin C. Klement, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 68 days.

(21) Appl. No.: 10/327,851

(22) Filed: Dec. 23, 2002

(65) Prior Publication Data

US 2004/0119002 A1    Jun. 24, 2004

(51) Int. Cl.
*H01J 3/14* (2006.01)
(52) U.S. Cl. ................................ 250/235; 347/250
(58) Field of Classification Search ........ 250/234–236; 347/225, 248–250, 233–235; 359/197
See application file for complete search history.

(56) References Cited

U.S. PATENT DOCUMENTS

| | | | |
|---|---|---|---|
| 3,803,637 A | 4/1974 | Martin et al. | |
| 4,037,231 A | 7/1977 | Broyles et al. | |
| 4,317,611 A | 3/1982 | Peterson | |
| 4,344,677 A | 8/1982 | Stuermer et al. | |
| 4,630,223 A | 12/1986 | Schoon | |
| 4,762,994 A | 8/1988 | Byerly et al. | |
| 4,797,749 A * | 1/1989 | Paulsen | 358/302 |
| 5,157,650 A | 10/1992 | Ozue et al. | |
| 5,543,956 A | 8/1996 | Nakagawa et al. | |
| 5,606,447 A | 2/1997 | Asada et al. | |
| 5,629,790 A | 5/1997 | Neukermans et al. | |
| 5,745,294 A | 4/1998 | Kudo | |
| 5,767,666 A | 6/1998 | Asada et al. | |
| 5,841,553 A | 11/1998 | Neukermans | |
| 5,880,765 A | 3/1999 | Ueda et al. | |
| 5,953,103 A | 9/1999 | Nakamura | |
| 5,959,760 A | 9/1999 | Yamada et al. | |
| 6,069,727 A | 5/2000 | Cho et al. | |
| 6,285,383 B1 | 9/2001 | Klement et al. | |

(Continued)

FOREIGN PATENT DOCUMENTS

WO        WO 89/12369        12/1989

*Primary Examiner*—Thanh X. Luu
(74) *Attorney, Agent, or Firm*—Luedeka, Neely & Graham, P.C.

(57) ABSTRACT

An improved method and apparatus for controlling a scanning laser are provided by the present invention. In accordance with a preferred embodiment, a single feedback sensor is placed along the scan path of a scanning laser such that it senses the laser twice during each scan. The time intervals between the sensor sensing the laser are measured and examined to determine the position and direction of the scanning laser. These time intervals may also be used to ensure that the scanning device is operating at its resonant frequency. In systems that require detecting the laser as it enters and leaves the imaging window, a reflective device is used to create a beam path from the edge of the imaging window back to the single feedback sensor such that the sensor detects the laser four times during each scan. In such an embodiment, the drive signal used to scan the laser along its scan path can be compared to the pulses received from the sensor to determine whether or not a detected time interval corresponds to a particular physical portion of the scan path.

15 Claims, 29 Drawing Sheets

U.S. PATENT DOCUMENTS

| | | |
|---|---|---|
| 6,295,154 B1 | 9/2001 | Laor et al. |
| 6,411,321 B2 | 6/2002 | Tanimoto et al. |
| 2002/0122217 A1 | 9/2002 | Nakajima |
| 2002/0125416 A1 | 9/2002 | Niito |
| 2003/0048352 A1 | 3/2003 | Kato et al. |
| 2003/0071125 A1 | 4/2003 | Yoo |

* cited by examiner

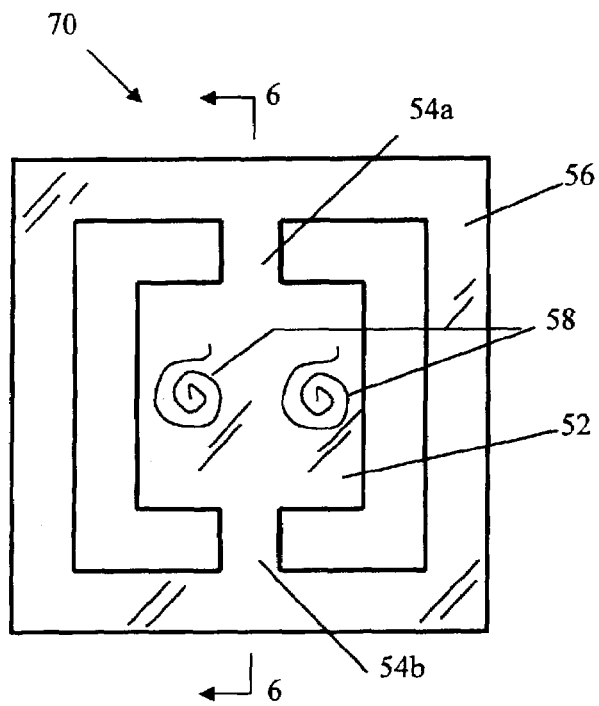
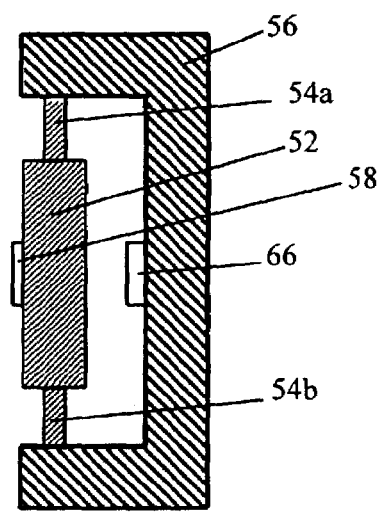
Fig. 5    Fig. 6
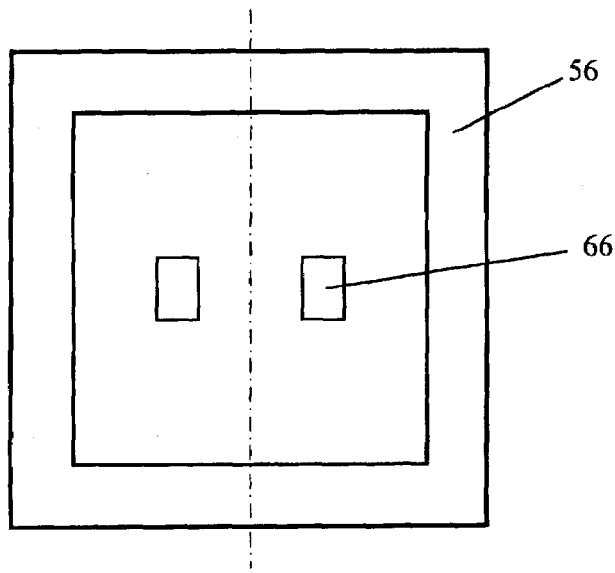
Fig. 7

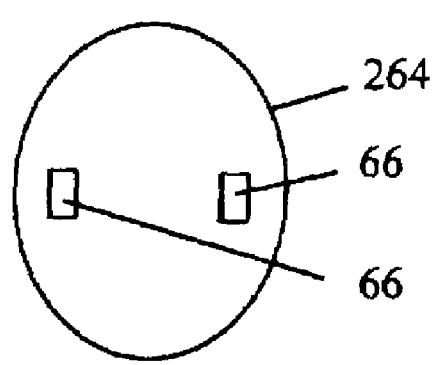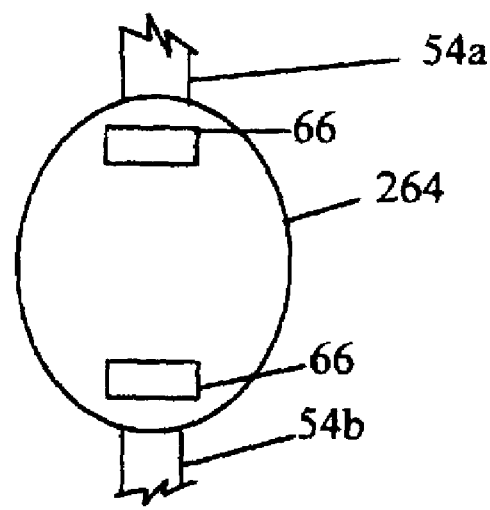
Fig. 21a  Fig. 21b

DEVICE FOR DETERMINING POSITION AND MOVEMENT OF SCANNING LASER BEAM

FIELD OF THE INVENTION

The present invention is generally directed to determining the position and scan direction of an oscillating scanning member. More particularly, the present invention is directed toward the use of a positional feedback sensor to determine the position and direction of travel of a scanning or sweeping laser beam.

BACKGROUND OF THE INVENTION

Scanning members such as scanning lasers are used in a variety of products for a variety of reasons. For example, laser printers use a scanning laser to create an image by scanning a modulated laser beam across an area covered with a material that is influenced by the laser to create an image that is then transferred to a piece of paper. In order to create a detailed, high resolution, image, the position and scan direction of the laser beam must be precisely known and controlled. Typically this control is achieved by using components manufactured to precise standards to construct the scanning laser and calibrating the scanning laser once it has been assembled. Unfortunately, the operating characteristics of the components used to construct the scanning laser tend to change over time. Thus, the precision of the scanning laser tends to change with conditions and time. For example, the performance of many electrical and mechanical components varies with temperature. Thus, the operation of a scanning laser may vary as the unit heats up during use. Therefore, what is needed is an inexpensive and reliable method and apparatus for determining the position and scan direction of a scanning member over a long period of time in a variety of environmental conditions.

SUMMARY OF THE INVENTION

The foregoing and other needs are met by a device that determines the position and movement direction of a scanning member. Preferably, the scanning member is a scanning laser beam that is produced by focusing a laser beam on an oscillating reflective device. A drive signal is used to produce and control the oscillation of the oscillating reflective device, and the device includes a sensor that produces an output when the laser beam scans across the sensor, which is positioned along a scan path of the laser. A clocking means measures time intervals between the detections of the scanning laser beam by the sensor. A processor then determines the position and direction of the scanning laser beam based upon the measured time intervals and stored parameters. At least one of the stored parameters relates to the position of the sensor along the laser's scan path. The processor adjusts the frequency or the amplitude of the drive signal based on the measured time intervals. Preferably, the frequency is adjusted toward the oscillating reflective device's resonant frequency based upon the measured time intervals.

In an alternative embodiment, a reflective device is positioned along the scan path such that when the scanning laser is focused on the reflective device an optical path is created between the reflective device and the sensor that allows the sensor to detect the scanning laser. In such an embodiment, the direction of the scan may be partially validated or invalidated by verifying that during one drive signal cycle two sensor pulses were received when the drive signal was in a high state and two sensor pulses were received when the drive signal was in a low state. This validation test is accurate for many embodiments under most operating conditions, but it can be inaccurate in some circumstances. Therefore, a preferred validation test for verifying the direction of scan includes a more complex procedure.

To begin the test procedure when the resonant frequency is not known, the drive frequency is started at a frequency that is well below the resonant frequency of the oscillator, and the drive signal is used to initially determine when the forward sweep of the oscillator begins. After the occurrence of a predetermined edge of the drive signal, the next sensor pulse is assumed to be the first pulse in the forward sweep of the laser. The clocking means used to clock times between sensor pulses is reset each time a predetermined edge of the drive signal is produced. Typically, the clocking means is reset on a rising edge or a falling edge of the drive signal, depending on the design of hardware implementing the method. The frequency of the drive signal is incremented upwardly at a drive level that is known to be sufficient to cause the laser to strike the sensor and the reflecting device, if used. As the drive frequency approaches the resonant frequency, the laser will begin to strike the sensor and the reflective device, and four sensor pulses will be received during each drive cycle. The clocking means will determine four times indicating the time between each pulse and the following pulse. The frequency of the drive signal will continue to be increased incrementally and the measured times will be tested for the validity. After the forward sweep begins, the first and third measured times should decrease as the drive frequency increases and approaches the resonant frequency. Likewise, the second and fourth measured times in each cycle should increase as the drive frequency increases and grows closer to the resonant frequency. If the measured times are increasing and decreasing as expected, this validity test is met, and it is now known that a particular sensor pulse is the first pulse in the forward sweep of the laser. This procedure may also be performed by initially setting the drive frequency well above the resonant frequency and decrementing toward the resonant frequency.

If desired a second test may be performed to validate or invalidate the first validity test. The second test is based on the knowledge that, for particular drive frequencies near the expected resonant frequency, the measured times are expected to fall within predetermined ranges. Thus, as a second the test, the measured times are compared to the expected ranges. If the measured times fall within the expected ranges, the second validity test is met, and it is known that a particular pulse is the first pulse in the forward sweep of the laser. Either, both or different validity tests may be used. The validity tests compare characteristics of the measured times to stored information to ensure that the correct sensor pulse has been selected as the first pulse in the forward sweep.

If the resonant frequency of the oscillator is known and the drive frequency is near the resonant frequency, a slightly different procedure is used. As before, after the occurrence of a predetermined edge in the drive signal, the next pulse is designated as the first pulse in the forward sweep. Then the validation tests as described above are performed. If the validation test are not positive, the second pulse is designated as the first pulse in the forward sweep and the validation test are performed again. In most designs, either the first or second pulses after the predetermined edge will be the first pulse in a forward sweep and will be adjacent the imaging window. The times determined by the clock means are constantly monitored for possible problems. The monitored characteristics may include the rate of change in the clocked times, the magnitude of change in the clocked times, and the magnitude of the clocked times. These characteristics are compared against stored criteria, including ranges and thresholds, and if the criteria is not met, it is determined that the monitored times are erroneous, and operation is suspended and correction routines are begun.

The preferred embodiment discussed above provides a number of advantages over the prior art. For example, the use of a single sensor to detect the position and direction of the scan of a laser beam is more cost efficient than using multiple sensors. Furthermore, the ability to adjust the drive signal's frequency and amplitude allows the device to be operating in a variety of different conditions which may cause changes in the component's performance due to the passage of time. In addition, the use of a reflective device positioned along the scan path allows the sensor to detect when the scanning laser enters or exits an imaging window. Thus, the present invention improves the performance and efficiency for determining the position and scan direction of a scanning laser.

In another aspect, the invention provides a method of determining the direction of a scanning laser that is scanning back and forth along a scan path using a single sensor. The sensor detects the scanning laser when it is in a predetermined position. The method includes the step of determining time intervals wherein the time intervals correspond to the time between consecutive detections of the scanning laser by the sensor. The time intervals are then examined by comparing the lengths of two time intervals to determine the direction in which the laser is scanning. The frequency or the amplitude of the drive signal used to scan the laser is adjusted based upon the measured time intervals.

BRIEF DESCRIPTION OF THE DRAWINGS

Details of exemplary embodiments of the invention will be described in connection with the accompanying drawings, in which

FIG. 5 is a somewhat diagrammatical plan view of another torsion oscillator that may be used in embodiments of the invention;

FIG. 6 is a cross sectional view of the torsion oscillator of FIG. 5 taken along section line 6—6 in FIG. 5;

FIG. 7 is a view of the torsion oscillator of FIG. 6 with a plate 52 removed to reveal magnets 66;

FIG. 21a is a view of the back surface of an oscillating plate;

FIG. 21b is a view of the front surface of an oscillating plate;

DETAILED DESCRIPTION OF THE PREFERRED EMBODIMENTS

Figure 1:
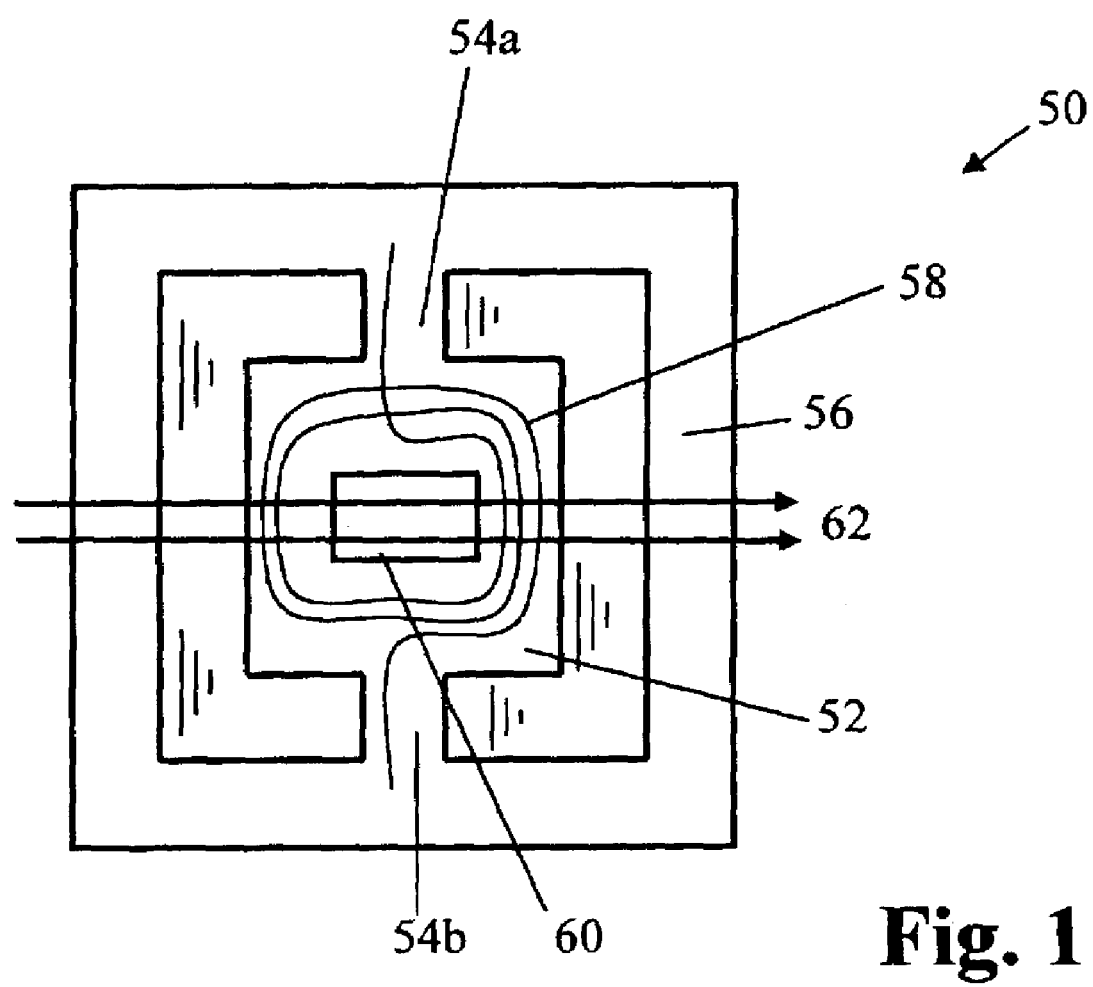
FIG. 1 is a somewhat schematic plan view of a representative torsion oscillator that may be used in one embodiment of the invention.

Preferred embodiments of the present invention utilize a torsion oscillator. The torsion oscillator 50 of FIG. 1 comprises a central generally rectangular plate 52 suspended by two extensions 54a, 54b of the material of plate 52. The plate 52 is generally symmetrical about its axis of oscillation. Extensions 54a, 54b are integral with a surrounding frame 56. Typically, the plate 52, extensions 54a, 54b and frame 56 are cut or etched from a single silicon wafer. A coil 58 of conductive wire and a mirror 60 or similar reflective surface are placed on the central plate. The mirror may be a smooth or polished surface on the silicon plate 52, since silicon itself is about sixty percent reflective Typically the mirror is a deposited layer of gold (or other material) on the smooth silicon substrate. Since the reflectivity of the silicon is wavelength dependent (falling off rapidly about 1 micron wavelength), a deposited mirror is typically used, or the raw silicon can be used without a mirror when system efficiencies allow. A 60% reflection would be suitable for some applications.

This entire assembly is located inside a magnetic field 62 (shown illustratively by lines with arrows), such as from opposing permanent magnets (not shown in FIG. 1). When a current passes through coil 58, a force is exerted on coil 58 that is translated to plate 52 since coil 58 is attached to plate 52. This force causes rotation of plate 52 around extensions 54a, 54b that twist with reverse inherent torsion.

Figure 2:
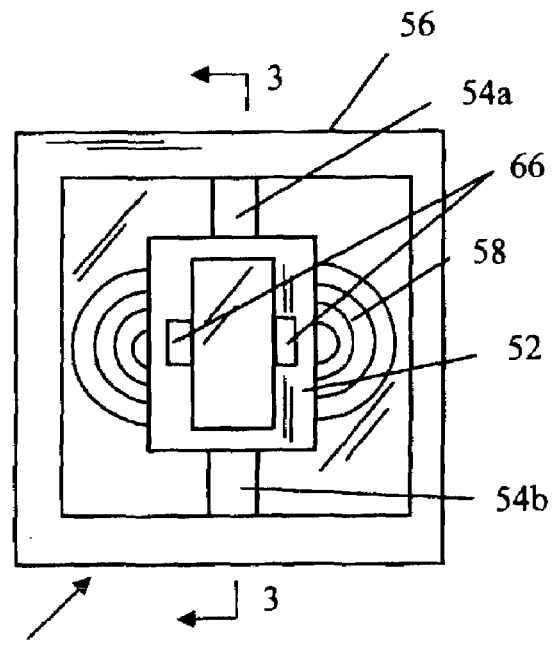
FIG. 2 is a somewhat diagrammatic top or plan view of one torsion oscillator that may be used in embodiments of the invention.
Figure 3:
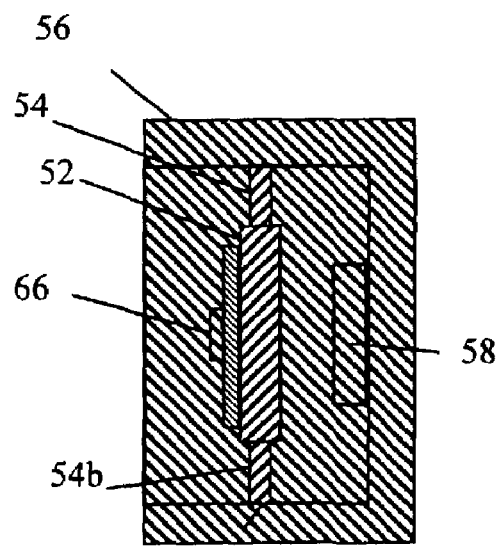
FIG. 3 is a cross sectional view of the torsion oscillator of FIG. 2 taken along line 3—3 in FIG. 2.
Figure 4:
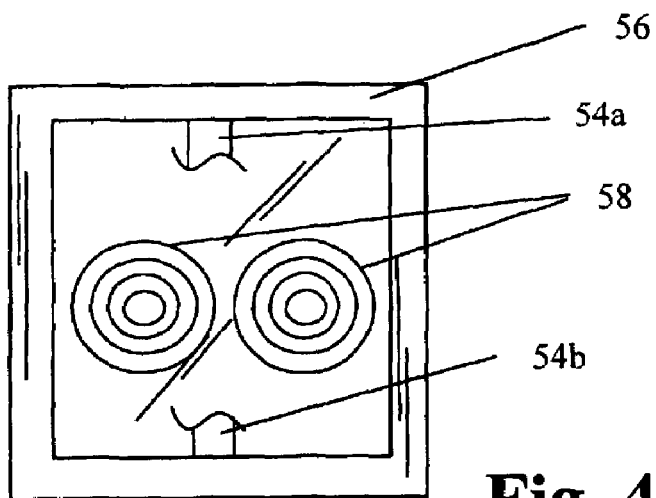
FIG. 4 is a somewhat diagrammatic plan view of the torsion oscillator of FIG. 1 with a plate 52 removed to reveal coils 58.

With reference to FIGS. 2–4, another embodiment of a torsion oscillator 64 is shown. In this embodiment, at least one magnet 66 is placed on the plate 52. At least one coil 58 is placed on the frame 56 in a corresponding position below or around plate 52. FIG. 3 depicts the positioning of magnet(s) 66 and coil(s) 58 in a cross sectional view of the torsion oscillator 64 taken along line 3—3 in FIG. 2. FIG. 4 shows the plate 52 removed and extensions 54a and 64b broken away to reveal the coil(s) 58 adjacent the frame 56.

As described in more detail hereafter, an alternating electrical drive signal, such as a square wave or a sine wave, is applied to the coil(s) 58 to produce an alternating electromagnetic field that interacts with the magnetic field of the magnets 66 and oscillates plate 52.

Another torsion oscillator 70 that may be utilized in another embodiment of the invention is shown in FIGS. 5–7. FIG. 5 is a somewhat diagrammatic plan view that shows at least one coil 58 placed directly on the plate 52. FIG. 6 shows the placement of at least one magnet 66 on frame 56 in a position corresponding to the placement of the coil(s) 58 on plate 52. FIG. 6 is a cross sectional view of the oscillator 70 taken along line 6—6 in FIG. 5. FIG. 7 is a plan view of the torsion oscillator 70 with plate 52 removed and extensions 54a and 54b removed such that FIG. 7 depicts the placement of magnet(s) 66 adjacent the frame 56. As described above, the magnetic field of magnet(s) 66 and the alternating current in coil(s) 58 create a force that causes rotational oscillation of the plate 52 about extensions 54a, 54b with reverse inherent torsion. The alternating current in coils 58 will be produced by an electrical drive signal applied to the coils 58 at an electrical drive frequency. Typically, the torsion oscillator 70 will oscillate at a mechanical operating frequency that is the same as, or substantially the same as, the electrical drive frequency. There may be a phase shift between the mechanical operating frequency and the electrical drive of frequency that may produce a small difference in frequency, at least for a short period of time. Also, the mechanical operating frequency may be a harmonic of the electrical drive frequency in some applications, but preferably the mechanical operating frequency and the electrical drive frequency are the same.

Other means may be employed to make such a system oscillate, such as static electricity, piezoelectric forces, thermal forces, fluid forces or other external magnet fields or mechanical forces. The use of coil drive by electric current in the various embodiments should be considered illustrative and not limiting.

The oscillator 50 functions as a laser scanner when a light beam is directed at the oscillating surface of mirror 60 instead of the much bulkier rotating polygonal mirror widely used in laser printers and copiers. Torsion oscillators also have other applications in which mirror 60 would not necessarily be used.

The spring rate of extension 54a, 54b and the mass of plate 52 constitute a rotational spring-mass system with a resonant frequency. Plate 52 can be excited to oscillate by an alternating current passing through the coil 58. To conserve power, the optimal electrical drive frequency of the current driven through coil 58 is the currently existing resonant frequency of the oscillator. However, the resonant frequency changes with environmental conditions, particularly with differences in temperature and also with differences in atmosphere (e.g. a vacuum or different fluids). Accordingly, for optimal operation of a torsion oscillator scanner the optimal electrical drive frequency of operation is variable. As above noted, the electrical drive frequency produces a mechanical operating frequency that is typically substantially equal to the electrical drive frequency.

The resonant frequency of a torsion oscillator is typically very sharply defined, meaning that scan amplitude (also referred to as the oscillation amplitude) drops significantly if the electrical drive frequency varies to either side of the currently existing resonant frequency. (This is also known as a high Q system.) For example, if the electrical drive frequency is held constant, the resulting mechanical frequency is also relatively constant. As changes in environmental conditions cause the resonant frequency of the torsion oscillator to change, the performance of the torsion oscillator will change. As aforementioned, the resonant frequency of a particular device can change with environmental conditions such as temperature or differences in atmosphere.

Figure 8:
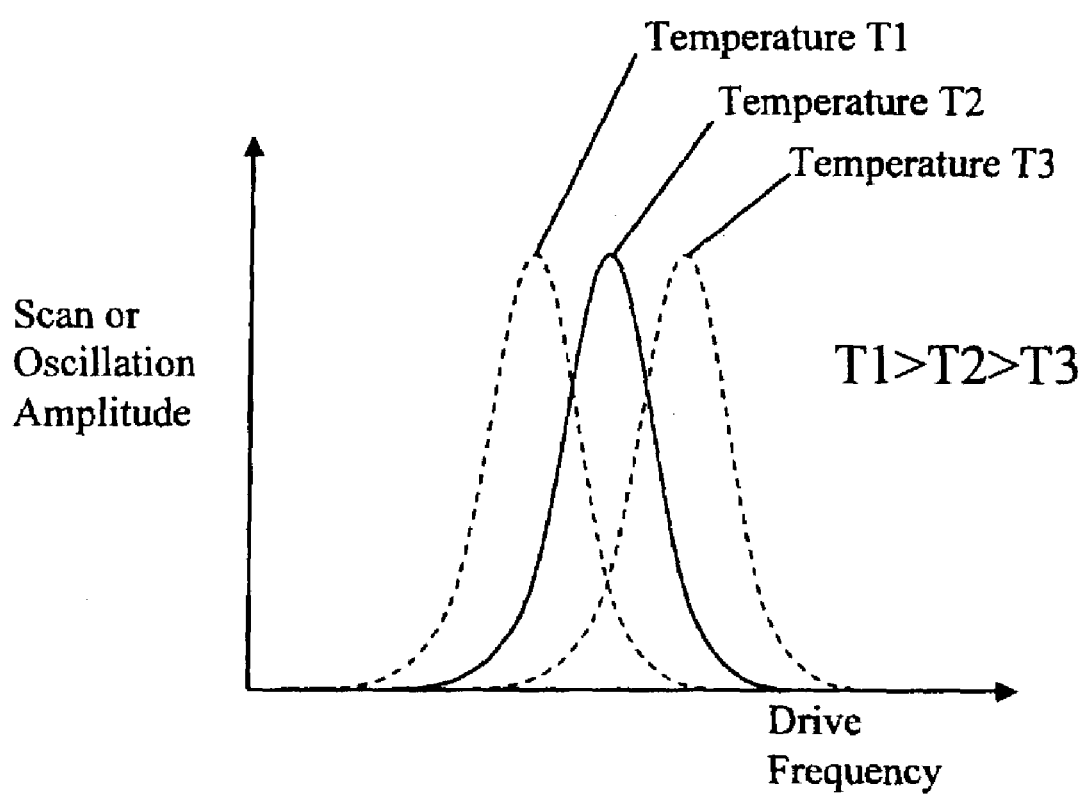
FIG. 8 is a graph illustrating a typical oscillator resonant frequency response at varying temperatures.

Typically, because of thermal expansion of material in the oscillator, resonant frequency of a silicon torsion oscillator drops with increasing temperature. FIG. 8 is a plot of such a typical system response with electrical drive frequency as the horizontal axis and amplitude of oscillation as the vertical axis, at a constant drive level for each temperature shown in FIG. 8. As used herein, a constant drive level preferably refers to a constant drive voltage or a constant drive current. However, in other applications it may also include a constant drive power. The left, dashed graph shows the response of the system at a temperature T1, which is the highest temperature illustrated. The solid graph shows response of the system at a temperature T2, which is lower than T1 but higher than T3, T2 being roughly centered in temperature between T1 and T3. The right, dashed graph shows the response of the system at temperature T3, the lowest of the three temperatures.

When the resonant frequency of the oscillator 50 changes, the control logic as hereinafter described may change the electrical drive frequency which changes the mechanical operating frequency of the oscillator 50, thereby maintaining the same physical oscillation amplitude. Alternatively, the control logic may change the drive level of the electrical drive signal while maintaining the same electrical drive frequency to thereby maintain the same physical oscillation amplitude of the oscillator 50, or the control logic may do nothing to the electrical drive signal and allow the physical oscillation amplitude of the oscillator 50 to change. If the control logic changes the electrical drive frequency, that changes the amplitude of the physical oscillation and the rate at which a laser is scanned across a target will change.

For example, assume the resonant frequency of the oscillator 50 increases, but the drive level and frequency of the electrical drive signal remain the same. Also assume that the absolute difference between the electrical drive frequency and the resonant frequency increases. In such a case, the physical amplitude of the oscillation will decrease because the oscillator 50 is physically harder to drive. When the oscillator 50 is used in a laser scanning apparatus 74 as discussed hereinafter with reference to FIGS. 9 and 10, a decrease in the oscillation amplitude of oscillator 50 will cause a decrease in the scan amplitude of the reflected laser beam. By scan amplitude it is meant the movement of the light beam as it sweeps from the farthest point on one side to the farthest point on the other side of the laser's sweep or scan as illustrated by arrow 76 in FIG. 9. The imaging window is that part of the scan amplitude in which data can be directed to a surface being imaged with modulated light. Typically, the imaging window is at or near the middle of the light beam sweep.

Figure 11:
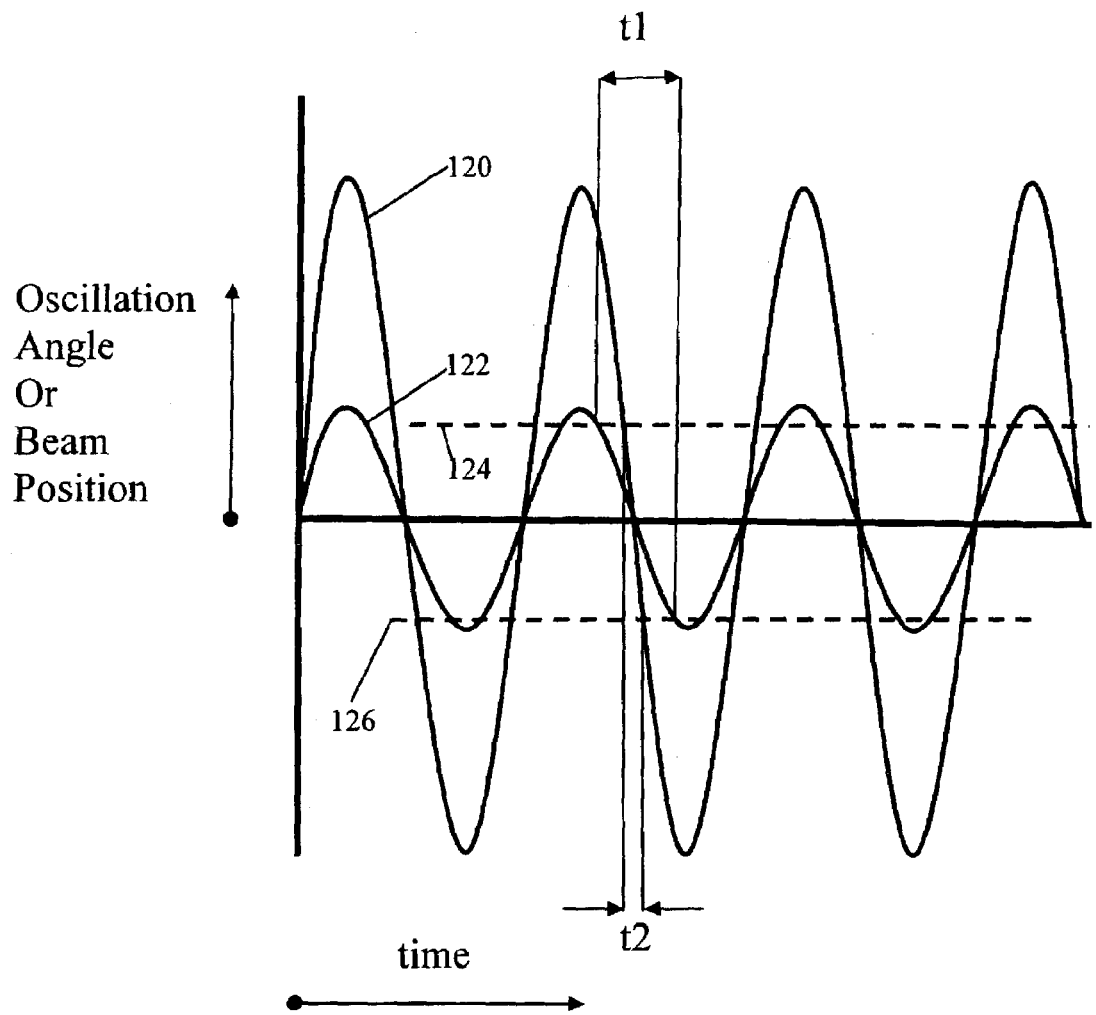
FIG. 11 is a graph of two scan amplitude responses created by a torsion oscillator reflecting a light beam.

The imaging window must be within all allowed scan amplitudes of the laser. For example, consider FIG. 11 which graphically represents two scan amplitudes. The X axis represents time and at the Y axis represents the beam position of a laser scan. In FIG. 11, the Y axis is also labeled as the oscillation angle because the laser is reflected from an oscillating plate, and the oscillation angle of the plate corresponds to the beam's position. FIG. 11 may be understood to represent either a graph of oscillation angle or beam position. Curve 120 represents a large amplitude laser scan and curve 122 represents a small amplitude laser scan. Both curves 120 and 122 are grossly exaggerated, and one would not necessarily expect either of these two scans to be found in a typical scanning apparatus. However, the exaggeration helps illustrate the relationship between the scan amplitude and the speed of the light beam as it crosses the imaging window. In this illustration, the imaging window is represented by dashed lines 124 and 126. The time, t1, represents the time required for curve 122 to cross the imaging window from the dashed line 124 to the dashed line 126. Likewise, the time, t2, represents the time required for curve 120 to cross the imaging window from the dashed line 124 to the dashed line 126. Clearly, t2 is much smaller than t1, which means that the laser scan represented by curve 120 is traveling much faster across the imaging window than the laser scan represented by the curve 122. If both laser scans are to be used to optically place the same data onto a target, the data rate associated with curve 120 must be faster than the data rate associated with curve 122. For example, if a laser printer is designed to print a fixed number of dots across an imaging window, it must print the dots at a faster rate if the laser scan corresponds to curve 120, as compared to a laser scan corresponding to curve 122. Thus, while the electrical drive frequency of a laser scanner is important, it alone does not dictate the actual time required for a light beam to cross the imaging window. The time intervals between sensors are functions of both frequency and amplitude.

Two Sensor Laser Scanner

Figure 12:
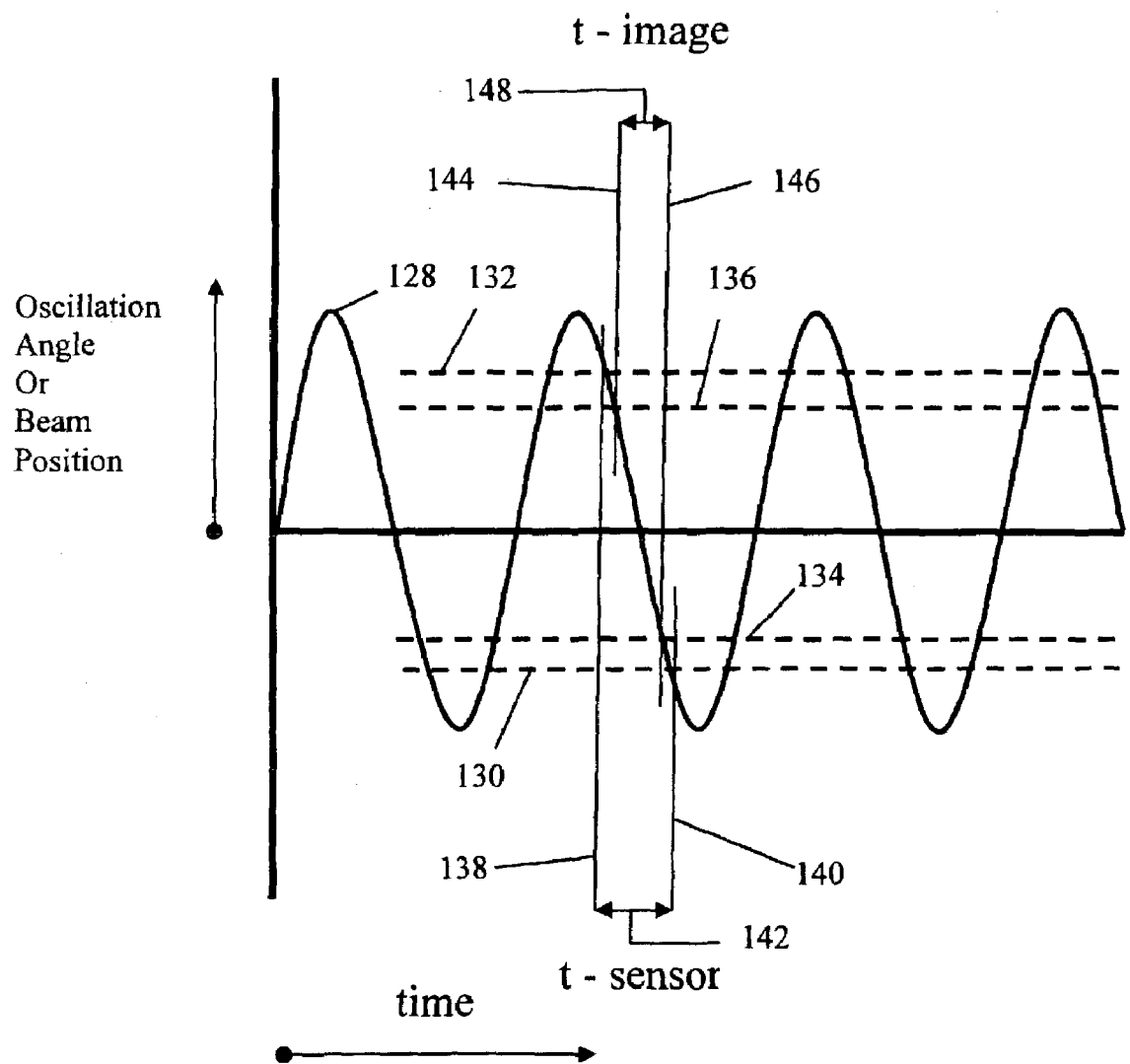
FIG. 12 is a graph of a laser scan with sensors disposed adjacent either side of an imaging window (also referred to as a "zone")

One way to determine the time required for a light beam to scan across an imaging window is to use a pair of sensors disposed adjacent opposite sides of the imaging window at a fixed distance from the imaging window. FIG. 12 is a graph illustrating a laser scan with a pair of sensors disposed adjacent either side of an imaging window. In FIG. 12, curve 128 represents the laser scan with the X axis representing time and the Y axis representing oscillation angle or beam position of the laser. Dashed line 130 represents the position of one optical sensor relative to the laser scan represented by curve 128 and, likewise, dashed line 132 represents the position of the other sensor. Dashed lines 134 and 136 represent the opposite sides of the imaging window, and the distance between lines 134 and 136 represents the amplitude or size of the imaging window. The sensors represented by lines 130 and 132 are positioned adjacent to, and on opposite sides of, the imaging window represented by lines 134 and 136. As the light beam sweeps across the sensors at lines 130 and 132, each sensor generates a signal and the time difference between the two sensor signals is the time required for the light beam to sweep from one sensor to the other. In FIG. 12, lines 138 and 140 indicate the time at which the laser scan of curve 128 swept across the sensors indicated by lines 130 and 132. The arrow 142 indicates the time required for the light beam to scan from one sensor to the other, which is referenced as "t-sensor" in FIG. 12. Lines 144 and 146 indicate the times at which the laser scan of curve 128 crosses the edges of the imaging window defined by lines 134 and 136. The arrow 148 represents the time for the light beam to scan across the imaging window of lines 134 and 136, which is referenced as "t-image" in FIG. 12.

The distance between the sensors represented by lines 130 and 132 an d the edges of the imaging window represented by lines 134 and 136 is known and is preferably small. Thus, the time difference between t-sensor and t-image may be calculated or approximated. Likewise, the time delay between the light beam striking the sensor and the light beam crossing an edge of the imaging window may be calculated or approximated. In one embodiment, the sensors represented by lines 130 and 132 are placed very near the imaging window represented by lines 134 and 136. Thus, the difference between t-sensor and t-image is small relative to the size of t-image. The distance between lines 138 and 144 represents the time delay required for the light beam to travel from the sensor represented by line 132 to the leading edge of the imaging window represented by line 136. The distance between line 146 and line 140 represents the time delay required for the light beam to travel from the trailing edge of the imaging window represented by line 134 to the sensor represented by line 130. If the sensors are placed very near the imaging window, these time delays are small relative to t-image and may be approximated by a constant or by a constant percentage of t-sensor. Alternatively, a lookup table may be provided that gives the time delays associated with each value of t-sensor, which will provide a very precise value for the time delays.

Using t-image and the time delays, the timing and the frequency of the data to be encoded in the laser is determined. The frequency is determined by dividing the total number of bits of data (pel slices) by t-image. When the laser passes the sensor represented by line 132 and is moving toward the sensor represented by line 130, the system waits for a time delay as discussed above, and then begins encoding or modulating the laser with the data. By reference to FIG. 12, it is noted that each sensor represented by lines 130 and 132 will produce two consecutive pulses. The leading edge of the imaging window is signaled by the second pulse from the sensor of line 132, one of which occurs at the intersection of curve 128 and line 138, for example. The timing of the data is preferably based upon that second pulse.

If the oscillator 50 is functioning as a laser scanner, as the resonant frequency changes at a constant electrical drive level and unchanged electrical drive frequency, scan amplitude varies, which varies the time of beam sweep between two sensors adjacent opposite sides of an imaging window. The imaging window is that part of the sweep in which data can be directed to a surface being imaged in the form of light modulation (such as on and off of the light beam at predetermined time periods). In one application the imaging window is centered generally in the middle of the beam sweep and is typically, about 8.5 inches in width, but the imaging window could be off-center relative to the beam sweep, but within the beam sweep. Likewise, the imaging window could be greater or smaller than 8.5 inches depending upon the particular application.

Apparatus to control the operation of this invention may include electronic control, such as a microprocessor or combinational logic in the form of an Application Specific Integrated Circuit (commonly termed an ASIC).

Figure 9:
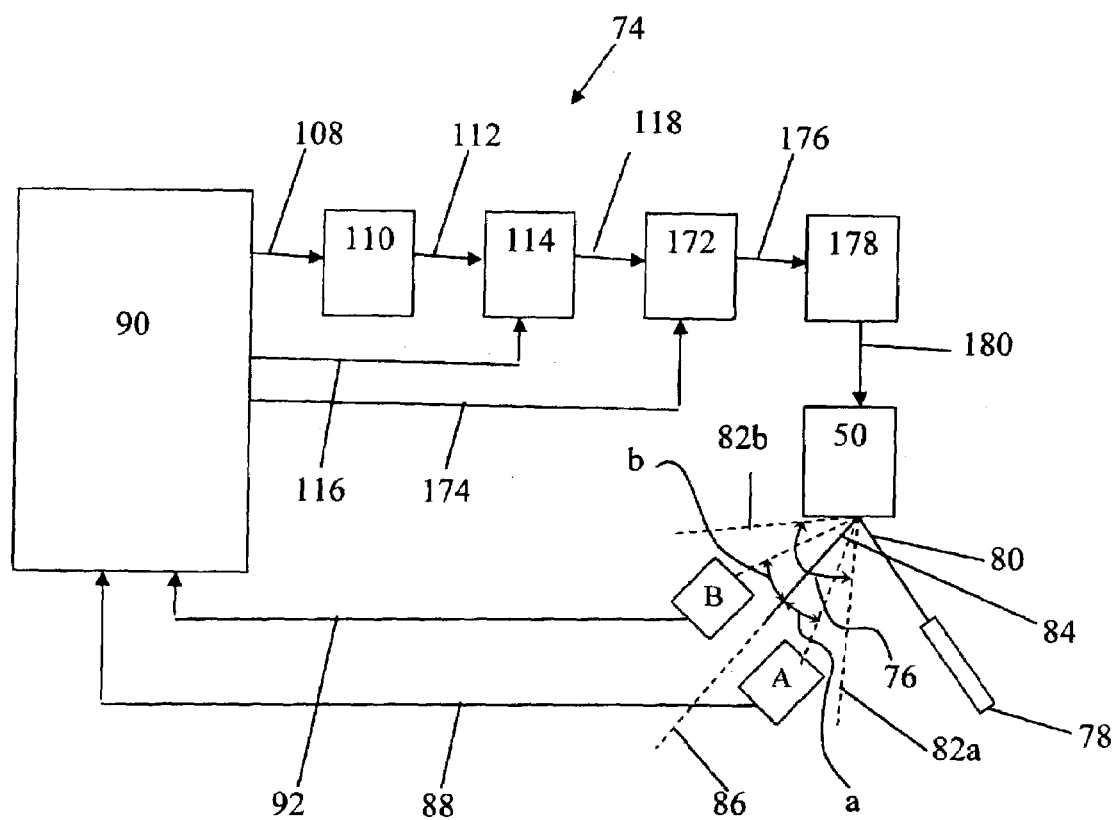
FIG. 9 is a schematic illustration of a laser scanning and detection system of one embodiment of the invention.

To illustrate the two-sensor implementation, a representative, schematic diagram of a laser scanning and detection system 74 is shown in FIG. 9. An oscillator 50 may be that of FIG. 1 although other embodiments of an oscillator may be employed including those shown in FIGS. 2–4 and 16–18. A light source such as for example laser 78 trains a light beam 80 onto the mirror 60 (see FIG. 1). As shown in FIG. 9, the scan amplitude is shown by broken lines 82a and 82b indicating the outer limits of the reflected laser scan (the scan amplitude) and arrow 76 indicating the largest angle of scan. The reflected light beam 84 is shown at a zero angle of scan and coincident with a middle line 86 in FIG. 9.

The outer limits of the scan amplitude (82a and 82b in FIG. 9) are not sensed in this embodiment and need not be sensed to implement preferred embodiments of this invention. Two sensors, A and B, are located within the outer limits 82a and 82b separated from the middle (line 86) by known angles a and b. The total angle between the sensors A and B is determined by adding angles a and b. Upon receiving the reflected light beam 84, sensor A creates an electrical signal on line 88 to control logic 90, which may be a microprocessor. Sensor B, upon receiving the reflected light beam 84, also creates an electrical signal on line 92 to control logic 90, which may be any type of logic system and may be based on microprocessors, ASICs, programmable logic, or other electronic devices.

Figure 13:
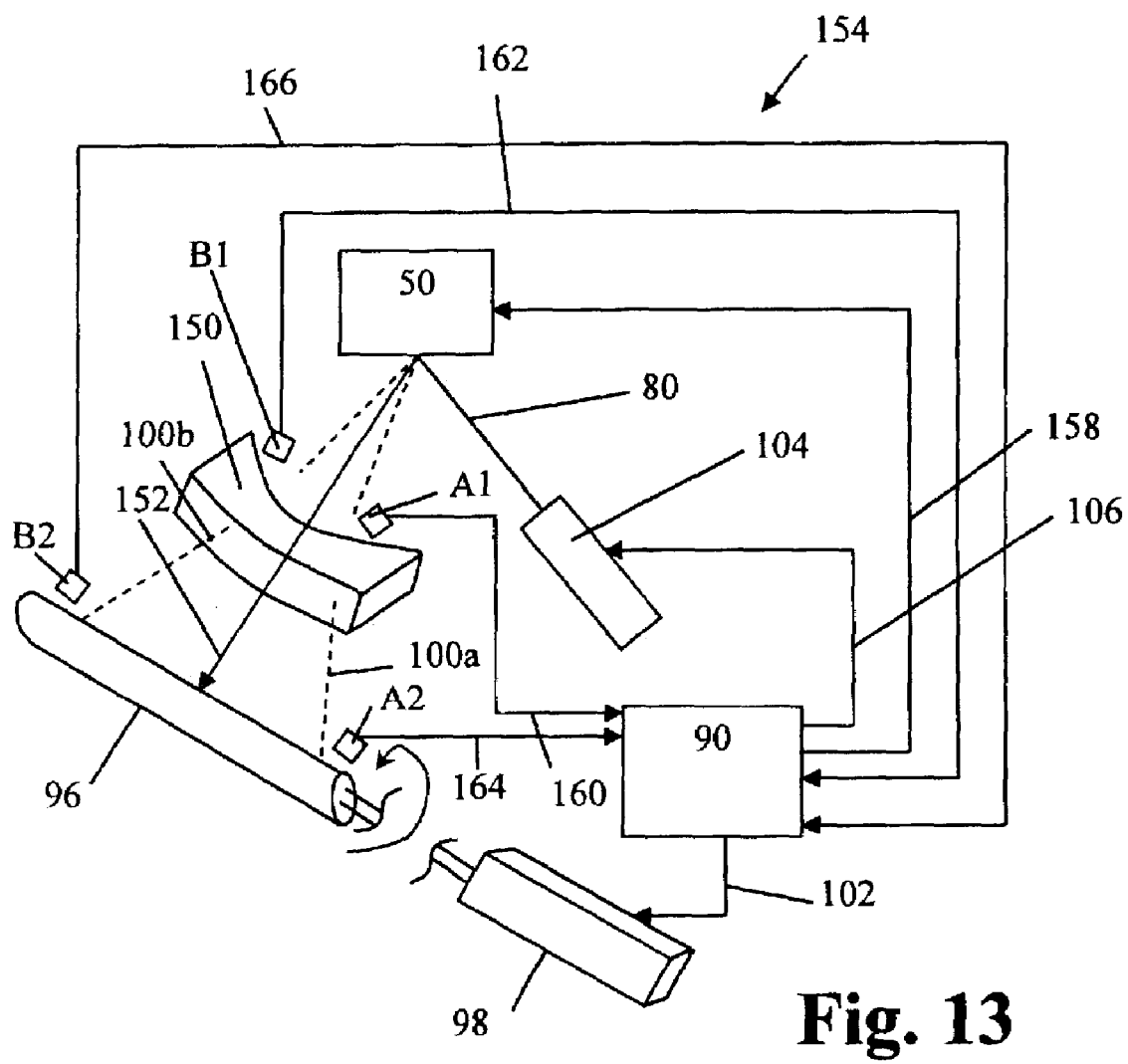
FIG. 13 is a schematic diagram of an imaging system illustrating an alternate embodiment of this invention.
Figure 14:
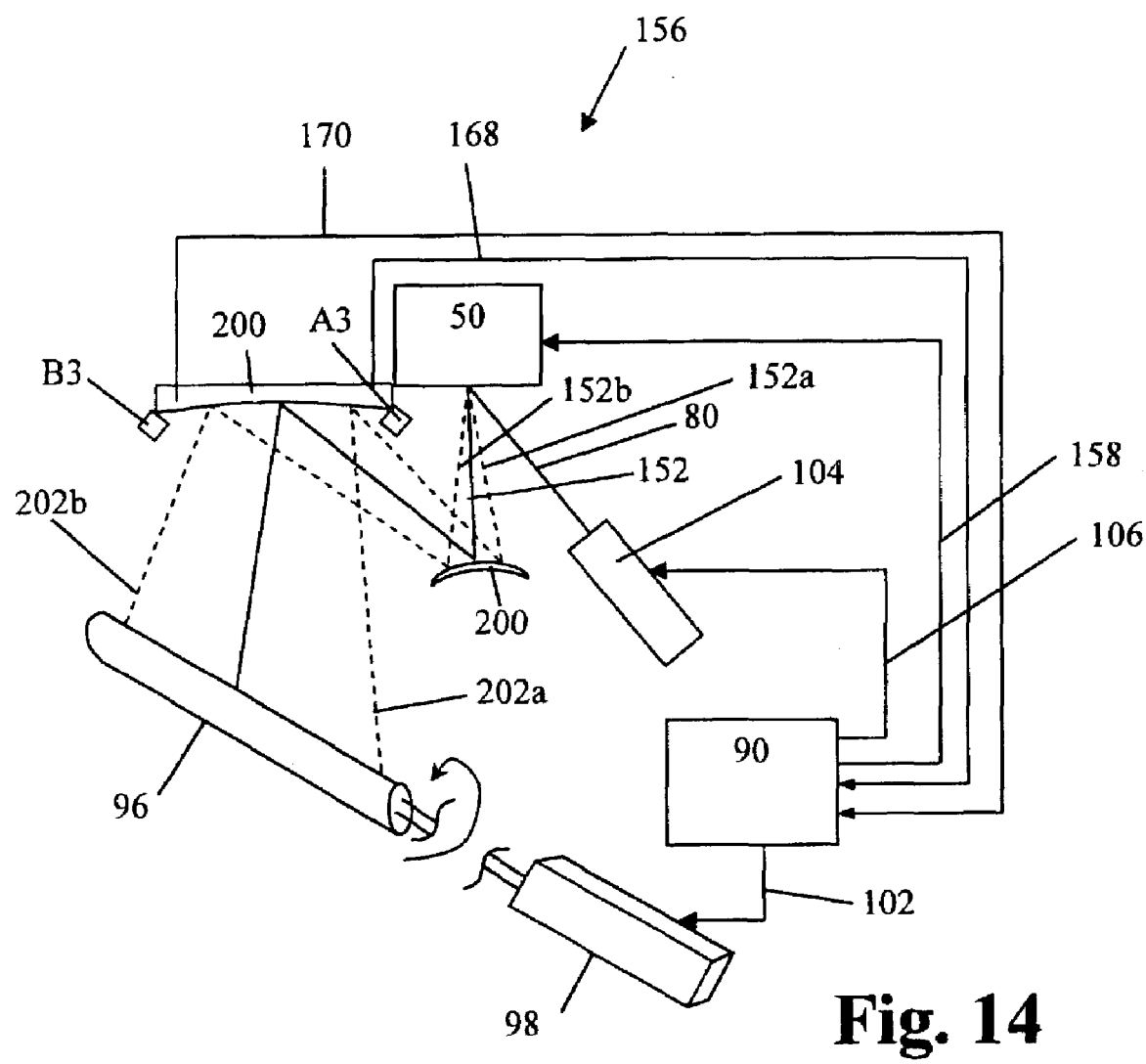
FIG. 14 is a schematic diagram of another imaging system representing yet another embodiment of the invention.

When the system of FIG. 9 is used in a scanning apparatus, such as a printer, it typically includes optics, such as mirrors or lenses, but such optics are not shown in FIG. 9 for purposes of clarity of illustration. Examples of optical configurations are shown in FIGS. 13 and 14. FIG. 13 depicts an optical configuration having a lens 150 that is used to modify the reflected light beam 152 as it oscillates between positions indicated by beams 152a and 152b. FIG. 14 shows an optical configuration of mirrors 200 used to multiply reflect the scanned light beam 152. The extremes of the path of light beam 152 is shown by dashed lines 202a and 202b. The optic configurations in FIGS. 13 and 14 are illustrative and should not be considered limiting. Numerous other optic configurations utilizing lens, mirrors, or both are possible.

The sensors A and B may be positioned before or after or inside the optics. (Again, "or" inclusively means one or more or all of the choices). For example, FIG. 13 shows various placements of sensors A and B. Sensors A1 and B1 are placed before lens 150 while sensors A2 and B2 are placed after the lens 150. Only sensors A1 and B1 may be used or A2 and B2 may be used. Alternatively, all six sensors A, B, A1, A2, B1, and B2 may be used together, or they may be used in various combinations such as any "A" sensor in combination with any "B" sensor, such as (A and B2) or (A1 and B). It should also be appreciated that sensors A, B, A1, B1, A2, B2, or combinations thereof may comprise a reflective surface such as a mirror. In such an embodiment, a sensor comprising a mirror would reflect the light beam 152 to another sensor. For example, in FIG. 13 sensor B2 could comprise a mirror that would reflect the light beam 152 to sensor A2. FIG. 14 shows placement of sensors A3 and B3 after mirrors 200. Sensors A3 or B3 could also comprise a reflective surface(s) reflecting light to other sensors.

Figure 15:
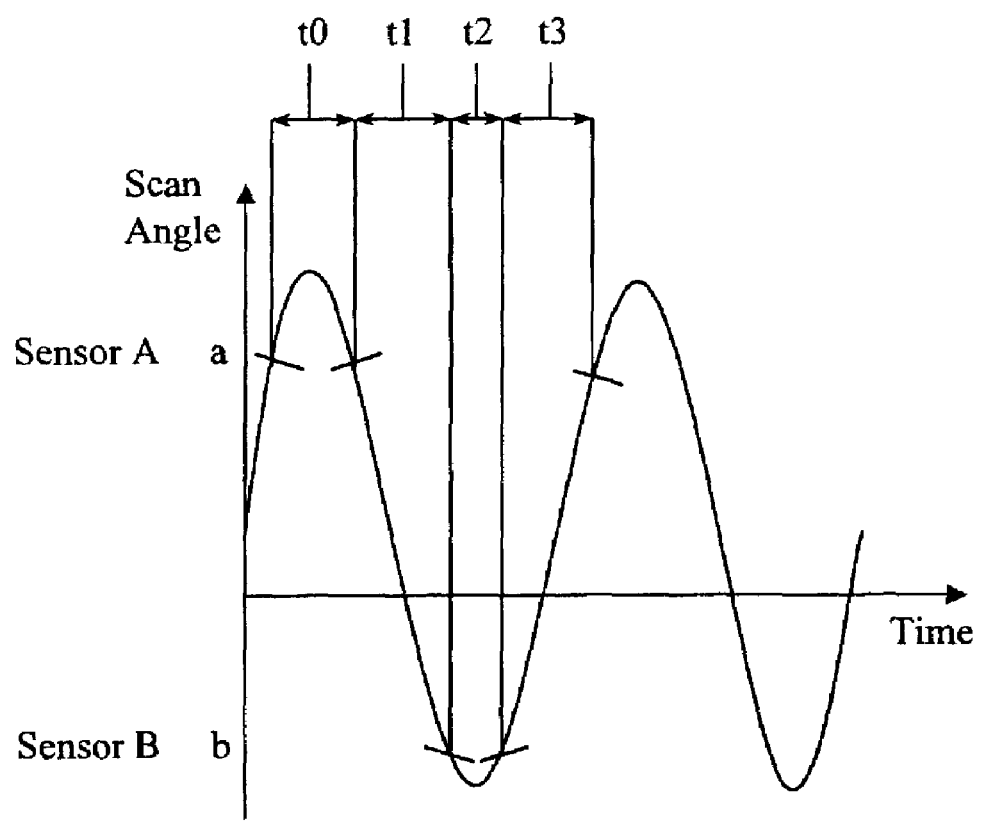
FIG. 15 is a graph that illustrates scan angle versus time for the torsion oscillator of FIG. 9.

The mechanical operating frequency of the laser scan may be detected using sensors A or B using a variety of techniques. For example, by measuring the time between a single signal from one sensor A or B (such as sensor A) followed by two, separated signals from the other sensor, (such as sensor B), and then the next two signals from sensor A, the electric drive frequency may be detected. FIG. 15 is illustrative, with vertical lines on the upper, vertical scale indicated as—a—being the time of signals from sensor A and the vertical lines on the lower, vertical scale indicated as—b—being the time of signals from the sensor B. The sinusoidal wave shown is illustrative of the laser's beam position as a function of time as it scans between lines 82a and 82b.

The time t0, between two consecutive signals from sensor A is the period when the light beam sweeps from sensor A, reaches its widest point (illustrated as line 82a in FIG. 9) and returns to sensor A. The time t1 is the period when the beam sweeps from sensor A to sensor B, thereby traversing the imaging window discussed in the foregoing, which is generally centered on the middle of the sweep (illustrated as line 86 in FIG. 9) and is between sensors A and B. The time t2, between two consecutive b signals is the period when the beam sweeps from sensor B, reaches its widest point (illustrated as line 82b in FIG. 9) and returns to sensor B. The time t3 corresponds to the time t1 while the beam is moving in the opposite direction.

Accordingly, observation of a sequence of signals unique to one full cycle, such as a, b, b, a, a or b, a, a, b, b defines the period, which is the reciprocal of scan frequency. FIG. 15 depicts observation of a sequence of signals a, a, b, b, a, a b, b. Within the observation shown in FIG. 15, a cycle is defined by the following sequences 1) a, a, b, b, a; 2) a, b, b, a, a; 3) b, b, a, a, b; and 4) b, a, a, b, b.

Figure 10:
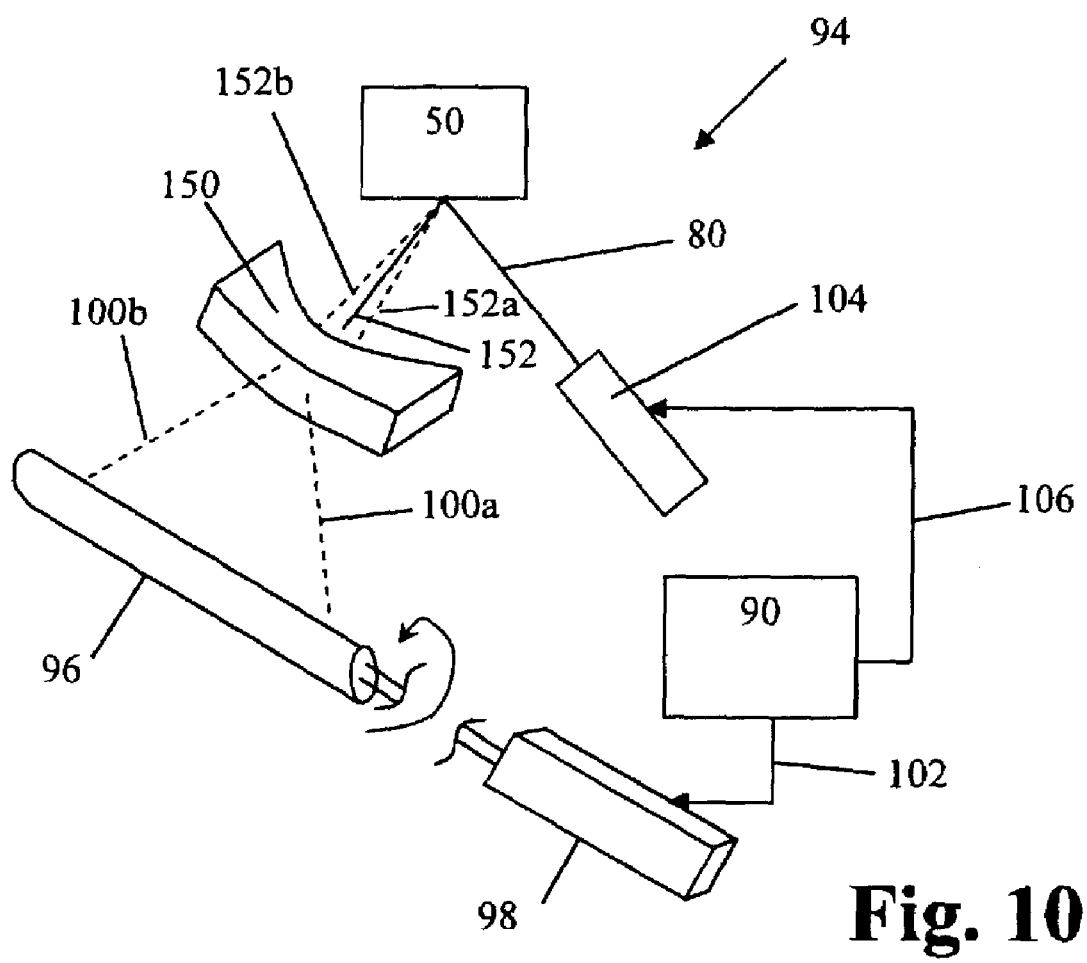
FIG. 10 is a schematic illustration of a typical imaging device representing one embodiment of the invention.

The cycle information and particularly t-image is used to adjust parameters in an imaging system 94 such as the system schematically shown in FIG. 10. Referring again to FIG. 12, upon control logic 90 observing t-sensor of the light beam sweep, control logic 90 calculates t-image and implements an adjustment as required to conform to t-image. A photoconductor, illustrated as drum 96 in FIGS. 10 and 13, rotated by drive train 98 receives light from the reflected light beam 152 through a lens 150 when the reflected light beam 152 is within the imaging window during its sweep as described above. The outer boundaries of the imaging window are illustrated by broken lines 100a and 100b. Drive train 98 is controlled by control logic 90 along path 102 to adjust the rate of rotation of drum 96. Similarly, control logic 90 sends drive information to the laser 104 along path 106 to modulate the laser 104.

Alternative imaging systems 154 and 156 are schematically shown in FIGS. 13 and 14. It should be noted that in FIGS. 13 and 14 path 158 between control logic 90 and torsion oscillator 50 is simplified for clarity of illustration. Path 158 may include elements such as a frequency generator, an amplitude adjustment system, an offset adjustment system, or a power drive system. Such elements are discussed in more detail with reference to FIG. 9.

In FIG. 13, paths 160 and 162 connect sensors A1 and B1 respectively to control logic 90. Sensor A2 sends a light detect signal along path 164 to control logic 90 while sensor B2 utilizes path 166 to transmit a signal to control logic 90. In FIG. 14, sensors A3 and B3 are connected to control logic 90 by paths 168 and 170 respectively.

Laser 104 is typically modulated to produce dots on a media, and the dots are often called pels. In printing applications, for example, each pel is often divided into a number of pels slices, for example 12 pel slices. To print a full pel, usually, only a number of pel slices are actually printed. For example, the laser 104 would typically be modulated to illuminate eight of the 12 pel slices to create a single printed pel. Thus, the modulation rate of laser 104 is determined in part by the pel density, in part by the number of pel slices, and in part by the speed of the light beam 152 as it sweeps across the image window defined by lines 100a and 100b.

In accordance with a preferred embodiment of this invention, the rotation speed of the photoconductor drum 96 is adjusted on drive train 98 by control logic 90 to provide a constant, desired resolution in process direction (the process direction being the direction perpendicular to the sweep direction). Similarly, the modulation period of laser 104 is adjusted by control logic 90 to provide a constant, desired resolution in the beam sweep direction.

Drum 96 is chosen illustratively as a photoconductor drum. The image adjacent such a drum is a latent electrostatic image resulting from discharge of the charged surface of the drum by light. Such an image is subsequently toned with toner particulates to be visible, transferred to paper or other media, and then fixed adjacent the media, as by heat or pressure. It will be understood that other surfaces being imaged may take adjacent the final image directly by reaction to light, such as photosensitive paper, or may take adjacent a non-electrostatic latent image that will later be developed in some manner.

Laser Beam Modulation

Referring to FIG. 12, the modulation of laser beam 104 may be understood. As shown in FIG. 12, the time required for the reflected light beam 152 to sweep across the computed imaging window (148, t-image) is a fraction of the measured time required for the reflected light beam 152 to sweep across sensors A and B (142, t-sensor). That fraction depends on several factors, including the optical design of the imaging system. A preferred embodiment of this invention determines the time interval necessary for the data rate calculation from a theoretical model of the imaging system design and from a calibration constant set at the time that the system is manufactured. In the preferred embodiment, the ratio of imaging window (t-image) to the period of time between sensors A and B (138 to 140) (t-sensor) may be deemed constant as the scan amplitude varies since the variance is not significant. This ratio may be, for example, 0.95 (i.e., 95 percent of the time (t-sensor) of the sweep between sensors A and B is the imaging window, t-image). This ratio is referred to as the window ratio.

The formula for the time period to drive each pel slice (or the time between the leading edges of each drive pulse), which is implemented by control logic 90 is the following: [(Scan Time Between Sensors A and B(t-sensor)) times (Window Ratio)] divided by [(quantity (eg., Print Width)) times (resolution) times (pel slices per pel). Stated differently, the data encoding frequency for laser 104 will be the product of the image scan width times the resolution times the number of pel slices per pel divided by t-image.

Assuming a scan time between the sensors of 100 microseconds, a window ratio of 0.95, a print width of 8.5 inches and resolution of 600 dpi and only one pel slice per pel, the scan time for each pel is $(100 \times 0.95)/(8.5 \times 600 \times 1) = 18.6$ nano seconds.

The formula for the rate of travel of the receiving surface, such as tangential velocity of the photoconductor drum 96, which is also implemented by the control logic 90, is the following: (Inches Traveled Per Cycle) divided by (Time Per Each Scan Cycle).

The time per cycle is the period of the oscillator. The inches-per-cycle is the intended resolution in the process direction. Assuming an oscillator 50 mechanical operating frequency of 2000 Hz, the period (or cycle) is the reciprocal, ($\frac{1}{2000}$) or 500 microseconds. Assuming a resolution in the process direction of 600 dpi, the inches per cycle is $\frac{1}{600}$ inch, and the rate of travel in the process direction is ($\frac{1}{600}$)/$500 = 3.333$ inches per second.

Control Sequence and Adjustment Events

Figure 16:
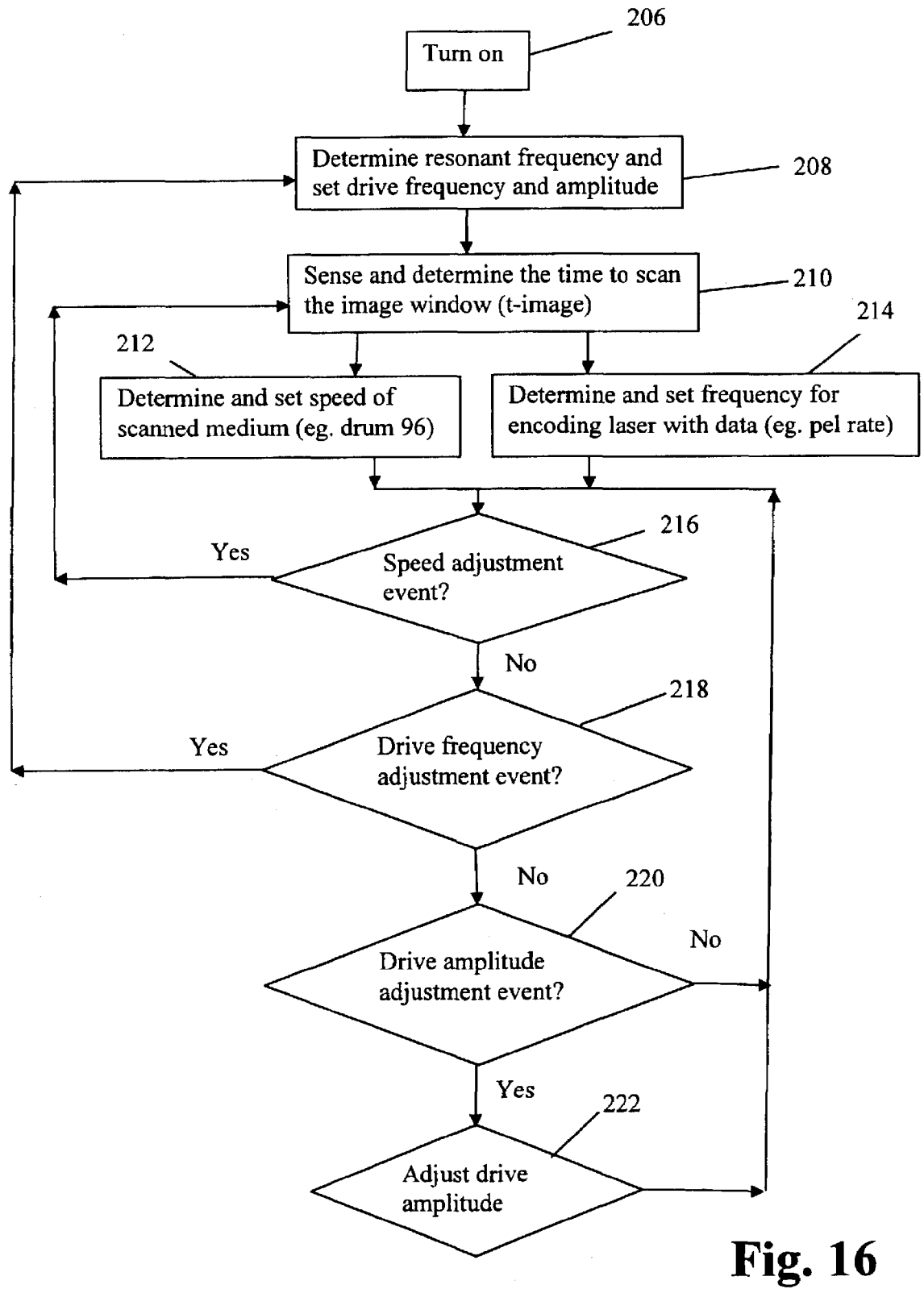
FIG. 16 is a flow chart of a control sequence to implement one embodiment of this invention.

FIG. 16 is a simplified flow chart illustrating a high level conceptual view of a scanning and adjustment process illustrating a sequence of control for embodiments of the invention. It will be understood that other detailed operations, such as error checking and interruptions, have been omitted for the sake of clarity. The first action is power on (Turn On), action 206. Control logic 90 then proceeds to action 208 in which the currently existing resonant frequency of the oscillator is determined by driving the oscillator 50 at a constant drive level, varying the frequency of the drive signal and monitoring the oscillation amplitude of oscillator 50. Alternatively, the oscillator may be driven at a constant frequency as discussed in more detail below. The frequency that produces the largest oscillation amplitude is the currently existing resonant frequency. Amplitude of oscillation may be determined in a number of ways, as discussed herein.

Referring to FIG. 16, after directly or indirectly observing or determining the currently existing resonant frequency, control logic 90 sets the electrical drive level at a predetermined level and sets the electrical drive frequency for oscillator 50 at or near the currently existing resonant frequency, and then moves to action 210. The time required for the laser to scan the imaging window is then sensed and determined as previously described with respect to t-image. Using t-image, control logic 90 then determines and sets the speed of the scanned medium as indicated in action 212 or determines and sets the frequency for encoding of the laser with data as indicated at action 214. Depending upon the application, one or both of actions 212 and 214 may be performed. Ideally, actions 212 and 214 are performed simultaneously when both actions are needed, or almost simultaneously in a very rapid consecutive order.

After actions 212 or 214 are performed, control logic 90 moves to action 216 and determines whether a speed adjustment event has occurred. A speed adjustment event is determined based on the application. For example, in a printing application, the speed adjustment event may be a time delay from the previous speed adjustment. In other words, the speed adjustment event is simply time, and speed is adjusted periodically based on time. A speed adjustment event could also be an outside event such as a pause in printing or a media change, for example a paper change. If a speed adjustment event has occurred, control logic 90 returns to action 210 and repeats the process of adjusting speed as previously discussed. If a speed adjustment event has not occurred, the process moves to action 218.

Again, depending upon the application, it may be desirable to adjust the electrical drive frequency during operation. In other applications, this will not be necessary. If the optional electrical drive frequency adjustment is implemented for a particular application, at action 218 the control logic 90 will determine whether a drive frequency adjustment event has occurred. Again, a drive frequency adjustment event may be the mere passage of time since the last adjustment, an internal event such as a change in the laser scan amplitude, or it may be an outside event such as a media change, for example a paper change. In the preferred embodiment, adjustment of media speed, drive frequency and drive amplitude are performed without interfering with the scanning or printing process. However, in other embodiments, operations such as printing may be stopped to perform these adjustments if necessary.

If a drive frequency adjustment event has not occurred, the process will move to action 220 and will determine whether an event has occurred requiring adjustment of the drive amplitude. If such event has occurred, the process moves to action 222 and the amplitude is adjusted as needed. Typically, the drive amplitude will be adjusted when the clocked times, (such as t0, t1, t2 and t3) indicate that the scan amplitude is too small or too large, and the magnitude of the adjustment will typically be dependant on the clocked times. If a drive amplitude adjustment event has not occurred, the process will loop back to action 216 and will continue to loop through actions 216, 218 and 220 until either a speed adjustment, a drive frequency adjustment, or a drive amplitude adjustment is required. If a drive frequency adjustment event has occurred, the process will move to action 208, determine the currently existing resonant frequency and set the electrical drive frequency and amplitude in the manner previously discussed.

Adjustment of the drive signal may be accomplished as follows, with reference to FIG. 9. The frequency, amplitude and offset control of FIG. 9 may operate in parallel with other operational logic or as an independent logic loop. As discussed in the foregoing, control logic 90 determines information corresponding to the currently existing resonant frequency (or the reciprocal thereof). To adjust the electrical drive frequency to correspond to the currently existing resonant frequency, control logic 90 creates a frequency control signal indicating a new electrical drive frequency on line 108. The new electrical drive frequency is preferably near the currently existing resonant frequency, but shifted a known shift frequency in a known direction relative to the currently existing resonant frequency. The new electrical drive frequency may also be set at precisely the currently existing resonant frequency in alternate embodiments. Line 108 connects to a frequency generator 110, which creates a signal having the new electrical drive frequency on line 112. The signal on line 112 is connected to amplitude adjust system 114. Control logic 90 also creates an amplitude control signal that defines a required amplitude on line 116.

Line 116 connects to amplitude adjust system 114, which creates a signal having the new electrical drive frequency and the required amplitude on line 118. The signal on line 118 is connected to a drive amplitude offset adjust system 172. As discussed below in more detail, because of the dynamic physical offset of the torsion oscillator 50, there is a departure from the sweep being centered about the center position indicated by line 86 in FIG. 9. Control logic 90 preferably uses the difference between the intervals t0 and t2 illustrated in FIG. 15 to determine the dynamic physical offset, and based on that, produces a control signal on line 174 defining a required drive amplitude offset that will compensate for the dynamic physical offset. The signal on line 174 is connected to offset adjust system 172.

The output of the offset adjust system 172 is a signal having the new electrical drive frequency, the required amplitude, and the drive amplitude offset on line 176. Line 176 is connected to power drive system 178, which creates an analog signal corresponding to this information on line 180, which is the new electrical drive signal that drives oscillator 50. Although shown as separate elements, it should be appreciated that many of the elements of FIG. 9 could be incorporated into a single device such as an ASIC.

In considering the process described above, it should be noted that the drive level adjustment is the easiest and most practical adjustment to implement, and it is preferred to design the oscillator 50 and define the adjustment events so that the drive level is the first to be adjusted, and adjustment of the drive frequency and speed are rarely required. In a stable application, the oscillator 50 may be designed so that the drive frequency and speed are set at a constant during manufacturing, and only the drive level is adjusted during operation.

Dynamic Physical Offset

Figure 17:
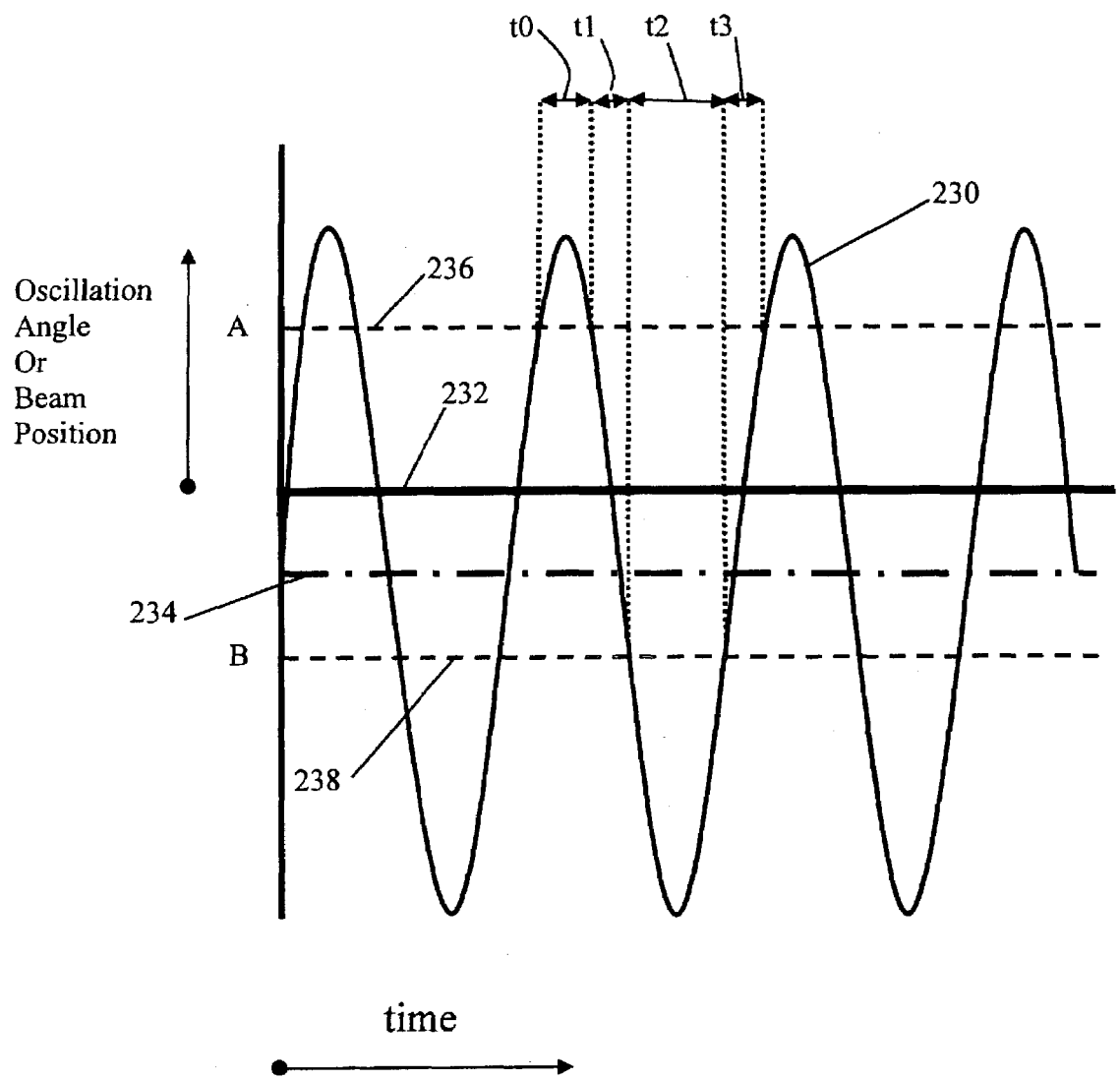
FIG. 17 is a graph of oscillation of a torsion oscillator or a laser scan with a dynamic physical offset.

Referring now to FIG. 17, there is shown a sinusoidal curve 230 representing the oscillation of oscillator 50 with a dynamic physical offset that was discussed above. In FIG. 17, line 232 represents the physical center position at which the oscillator 50 will reflect the light beam 80 to a center position (line 86) in the imaging window as shown in FIG. 9. If there is no static offset, the physical center position is the rest position of the oscillator 50. Ideally, the oscillator 50 would oscillate about a physical center position defined by line 232. However, due to imbalances and structural variances, dynamic phenomena depending upon differences between the device resonant frequency and applied electrical driving frequency, or disturbances to the system such as mechanical shock, vibration or airflow, the oscillator 50 will oscillate about a center position that does not correspond to physical centerline 232. Instead, when driven by a balanced electrical drive signal, it will oscillate about a center position such as that represented by dashed centerline 234. A balanced electrical drive signal is one that does not favor either direction of oscillation and does not compensate for the dynamic physical offset of the oscillator 50. The distance between lines 232 and 234 represents an angular distance between the ideal physical centerline 232, the rest position of the oscillator 50, and the actual dynamic centerline which represents the position of the oscillator 50 when it is positioned exactly halfway between the maximum angular position of the oscillator 50 in both positive and negative directions during physical operation. This angular distance represented by the distance between lines 232 and 234 is also called "dynamic physical offset". In FIG. 17, the dynamic physical offset has been grossly exaggerated for purposes of illustration. With continuing reference to FIG.

17, dashed line 236 represents the position of sensor A while dashed line 238 represents the position of sensor B. Sensor A produces pulses in response to the reflected light beam 84 when curve 230 crosses dashed line 236, and sensor B produces pulses when curve 230 crosses dashed line 238. The time delay between two pulses created by sensor A is represented by t0 and the time delay between two pulses created by sensor B is represented by t2. Under ideal conditions, t0 would equal t2. However, because of the offset between the physical centerline 232 and the dynamic centerline 234, t2 is greater than t0. Thus, in the one embodiment, the control logic 90 determines offset by comparing t2 and t0. Preferably, during calibration a table or formula is provided to specify the exact amount of offset corresponding to the size differences between t2 and t0.

To compensate for the physical offset of the oscillator 50 that is represented in FIG. 17, the drive signal is offset in the opposite direction. That is, if the oscillator 50 has physical characteristics causing it to naturally oscillate further to the left (the negative direction) then the electrical drive signal will be offset so that it drives the oscillator harder to the right (the positive direction). By offsetting the drive signal in a direction opposite from the physical offset of the oscillator, the oscillator 50 is forced to oscillate on or near the physical center line 232, which means the oscillator 50 has a center scan position as indicated by reflected light beam 84 and line 86 in FIG. 9. That is, in the preferred embodiment, reflected light beam 84 is positioned halfway between the outermost scan positions of the laser 78, is positioned in the center of the imaging window, and is positioned halfway between sensors A and B. It will be appreciated is that adjusting for the dynamic offset is not absolutely necessary. Even with offset, the reflected light beam 84 can fully scan the imaging window and a scanning function, such as printing, is performed so long as the data encoding rate and the speed of the print medium, such as a drum, are properly adjusted based on the scan time across the image, t-image. The dynamic physical offset of oscillator 50 should be limited in size depending upon the application and the capacity of the electrical drive system, such as the system represented in FIG. 9 by components 110, 114, 172 and 178. In essence, the dynamic physical offset should not prevent the reflected light beam 84 from illuminating both sensors A and B.

Stationary Coil

Referring again to FIGS. 2–4, one may appreciate the advantages of a torsion oscillator 64 having a central plate 52 suspended by two extensions 54a, 54b. In this embodiment, the extensions 54a, 54b operate as a torsion spring mount and are preferably integrally formed with a surrounding frame 56. A reflective surface, such as a mirror or the like, is preferably included as part of the plate 52 for reflecting light or other energy to a target. As best shown in FIG. 4, for this embodiment of the imaging system, the coil(s) 58 are located in a neighboring configuration with respect to the plate 52, preferably on the frame 56.

A number of advantages result from using the torsion oscillator 64 in an imaging system, such as a laser printer or optical scanner. For example, by locating the coil(s) 58 away from the plate 52, it is possible to induce a greater oscillatory range of motion in the plate 52 without significant temperature increases that affect the oscillator's resonant frequency that may occur when the coil(s) 58 are located on the plate 52. By locating the coil(s) 58 away from the plate 52, larger conductors can be used in the coil(s) 58, since temperature influences tend to be minimal when the coil(s) 58 are located away from the plate 52. Greater drive currents are obtainable by using larger conductors to drive the coil(s) 58, to thereby induce a larger oscillatory range of motion. According to a preferred embodiment of the imaging system 94, 154 or 156, it is preferred to drive the coil(s) with a drive current of between about fifty mill amperes and two hundred mill amperes achieving power levels of between about two hundred fifty and one thousand milliwatts.

According to this embodiment, the oscillating plate 52 includes at least one magnet 66, and the frame 56 includes at least one coil 58 positioned below the at least one magnet 66 located on the plate 52. FIG. 3 depicts the positioning of magnet(s) 66 and coil(s) 58 in a cross sectional view of the torsion oscillator 64 taken along line 3—3 in FIG. 2. As shown in FIG. 2, line 3—3 also depicts an axis of rotation for the plate 52.

FIG. 4 depicts the coil(s) 58 on the frame 56 with the plate 52 removed. The electromagnetic field induced by magnet(s) 66 and coil(s) 58 interact to cause plate 52 to oscillate around extensions 54a, 54b, about the plate's rotational axis (line 3—3). The plate 52 rotates clockwise and counterclockwise about its rotational axis, when alternating current is driven through the coil(s) 58.

For this embodiment, it is preferred to provide a sufficient power to the coil(s) 58 to produce oscillations about the rotational axis (line 3—3) of greater than about +/−fifteen degrees at a nominal frequency of about 2.6 kHz. The system can produce lesser amounts of oscillatory motion; but for laser printing applications, it is most preferred to induce rotations of greater than +/−fifteen degrees to produce quality printing. For a given laser printing application, a printer (such as imaging system 154 and 156) provides control signals to control the drive level provided to the coil(s) 58 to thereby oscillate the plate 52 and effect printing (scanning) operations to print an image according to image data provided to the printer.

Figure 18:
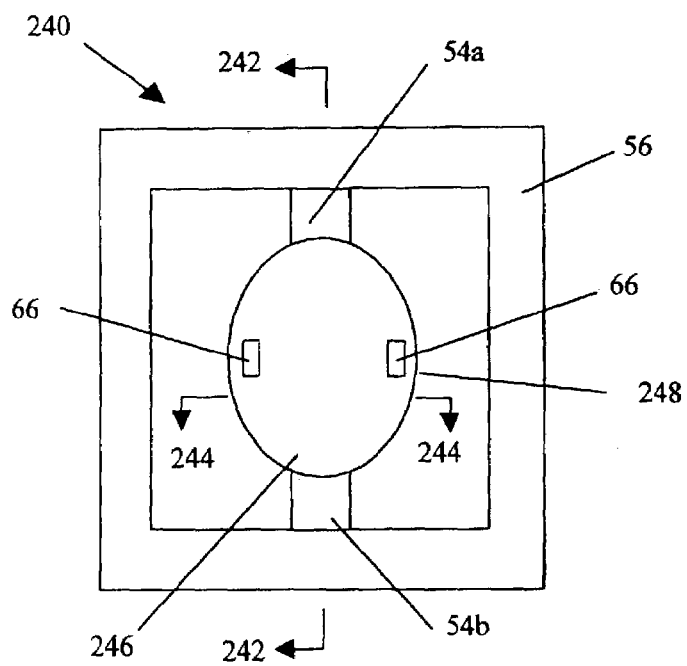
FIG. 18 is a somewhat schematic plan view of a torsion oscillator having an oval oscillating plate.
Figure 20:
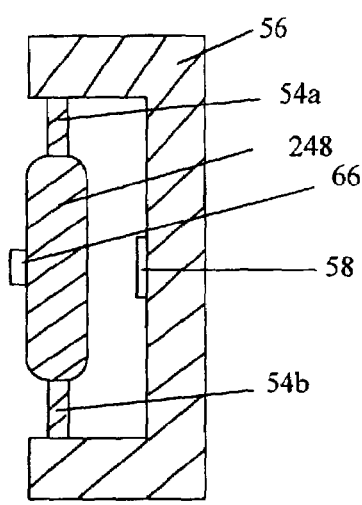
FIG. 20 is a cross sectional view of the torsion oscillator of FIG. 18.
Figure 19:
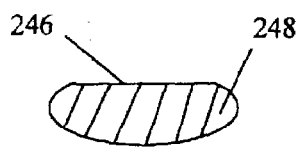
FIG. 19 is a cross sectional view of the plate of the torsion oscillator of FIG. 18.

With reference now to FIG. 18, yet another embodiment of a torsion oscillator 240 is shown. The torsion oscillator 240 includes a central plate 248 having a non-rectangular geometrical configuration in at least one viewing direction. Preferably, the plate 248 has a non-rectangular shape, a generally symmetrical shape about the axis of rotation, such as elliptical, oval, racetrack, or circular. As shown in the cross-sectional view of the plate 248 in FIG. 19, a non-rectangular shape can also be formed in a second viewing direction through the thickness of the plate 248. As shown in FIG. 20, the non-rectangular shape may be used in the third viewing direction of the plate 248 as well. FIG. 19 depicts a cross-sectional view of the plate 248 taken along the lines 244—244 of FIG. 18, wherein the plate 248 has a substantially elliptical cross-section. The plate 248 can also have different cross-sectional configurations, such as oval, circular, and racetrack. In one preferred embodiment, the plate 248 in plan view has a substantially elliptical geometrical configuration, having a major axis of about four to six millimeters and a minor axis of about one to three millimeters. As described above, the plate 248 is suspended by two extensions 54a, 54b, integral with a surrounding frame 56. A reflective surface 246, such as a mirror or the like is disposed on the plate 248 for reflecting an energy source, such as a light source, to a target.

The plate's non-rectangular shape is aerodynamically streamlined to minimize wind resistance and interference effects. Additionally, the non-rectangular plate 248 tends to reduce the amount of inertia for a given plate width and helps provide higher resonant frequencies.

The non-rectangular plate 248 implementation may use a rectangular or non-rectangular reflective surface 246 which is preferably substantially flat and has a shape in plan view of elliptical, circular, racetrack, oval, or the like. Reflective surface 246 is positioned on the plate 248 for reflecting the light source to a target. In alternative embodiments, the reflective surface 246 can be formed as a curved, concave, and/or a diffractive surface, such as an etched Fresnel lens mirror. The reflective surface 246 can be further subdivided into a plurality of reflective surfaces, having different reflective properties.

FIG. 20 depicts the positioning of magnet(s) 66 and at least one coil 58 in a cross sectional view of the torsion oscillator 240 taken along line 242—242 in FIG. 18. Line 242—242 also depicts an axis of rotation for the plate 248. It should be noted that only one coil 58 may be located on the frame to oscillate the plate 248.

In the embodiments described above, there are other advantages associated with locating the coil(s) 58 away from the rotating reflective surface 246 of the oscillator 240. For example, since the drive coils are not located on the plate, minimal patterning exists on the reflective surface 246. Also, power dissipation from the applied drive current does not directly heat the oscillating plate, leading to more consistent operation at varying drive levels. Due to the very small area available on the plate for coils, relatively few coil turns can be placed on the plate, requiring a strong and bulky external permanent magnet assembly to produce sufficient scan angles. Placing a small but powerful magnet on the oscillating plate allows a more compact external coil to be used, one that can be designed to minimize intruding on the input and output beams on the device. As compared to the coil on mirror design, this design essentially allows for more efficient elliptical plate shapes without degrading the available torque to provide the desired scan angle. Thus, this arrangement tends to provide a larger clear aperture area for the reflective surface 246 for a given surface area of the rotating plate 248. (With reference to the mirror, clear aperture area refers to the usable portion of the plate that can be utilized to redirect light.)

This larger clear aperture area of reflective surface 246 tends to lead to a larger scan operating window and the resultant potential operational speed advantages associated with a larger scan operating window. These advantages are due to the fact that in devices with a patterned coil 58 on the oscillating mirror plate, some percent of the plate's surface area is covered by patterned coils. This leaves less room for the mirrored surface 24. Thus, the mirror area to total plate area ratio is a fraction less than one such as 50%. In the case where the magnets are placed on the mirror plate, the magnets can be placed on the back surface or on the front surface along the axis of the torsion bars, above and/or below the mirror area. These options are illustrated in FIG. 21a in which magnets 66 are mounted on the back of plate 264. In FIG. 21b, the magnets are mounted on the front side of the plate 254 aligned with the longitudinal axis of extensions 54a and 54b. This results in a mirror that is as wide as the scanner plate in the axis perpendicular to the torsion bar axis. Thus, for the same size mirror area, a smaller moving plate can be used. The smaller moving plate requires less drive current, because in general smaller plates have less mass and are easier to drive. Therefore, if we apply some upper bound to the drive current, the smaller plate is better and, if we apply some lower limit on the operational frequency, the smaller plate is better. The larger mirror size allows for less critical alignment requirements, and for laser printer applications, a larger laser beam diameter at the reflective surface of the rotating plate. A larger spot size at the reflective surface tends to provide a smaller laser spot size at the image plane. This spot size relationship results from optics. This smaller spot size is predicted by laser beam propagation theory, which shows that when a laser beam is focused by a lens, the resultant spot size will decrease in radius as the input beam increases in radius when other laser beam parameters (wavelength and divergence) are held constant. When a laser beam is passed through a focusing lens, the laser beam generally converges to a minimum diameter near the focus of the lens depending upon the divergence of the laser beam prior to entering the lens. For a given wavelength and a given lens focal length, the size of the focused spot is dependent on only one other parameter, the diameter of the beam entering the lens. A larger input beam diameter can produce a smaller resultant spot size. Thus, as the mirror in the scanning system grows larger, the laser spot that can be produced grows smaller. Therefore, for a given plate size, the print resolution can be greater with an oscillator that does not have coils on the plate.

With a small mirror (eg. a small reflective surface 246), it is desirable to "overfill" the mirror with laser beam, so that the size of the reflected beam is defined by the mirror size. This alleviates the alignment of the laser relative to the scanner, and also provides for a selected portion of the beam to be reflected. This selected portion (the central region of the beam) will have an intensity cross section that is substantially more uniform than an un-truncated beam, where the intensity follows more of a "gaussian" profile. The truncated beam intensity would be more of a "top hat" profile. Overfilling is not practical with devices that have coils patterned on the oscillating plate.

Figure 21:
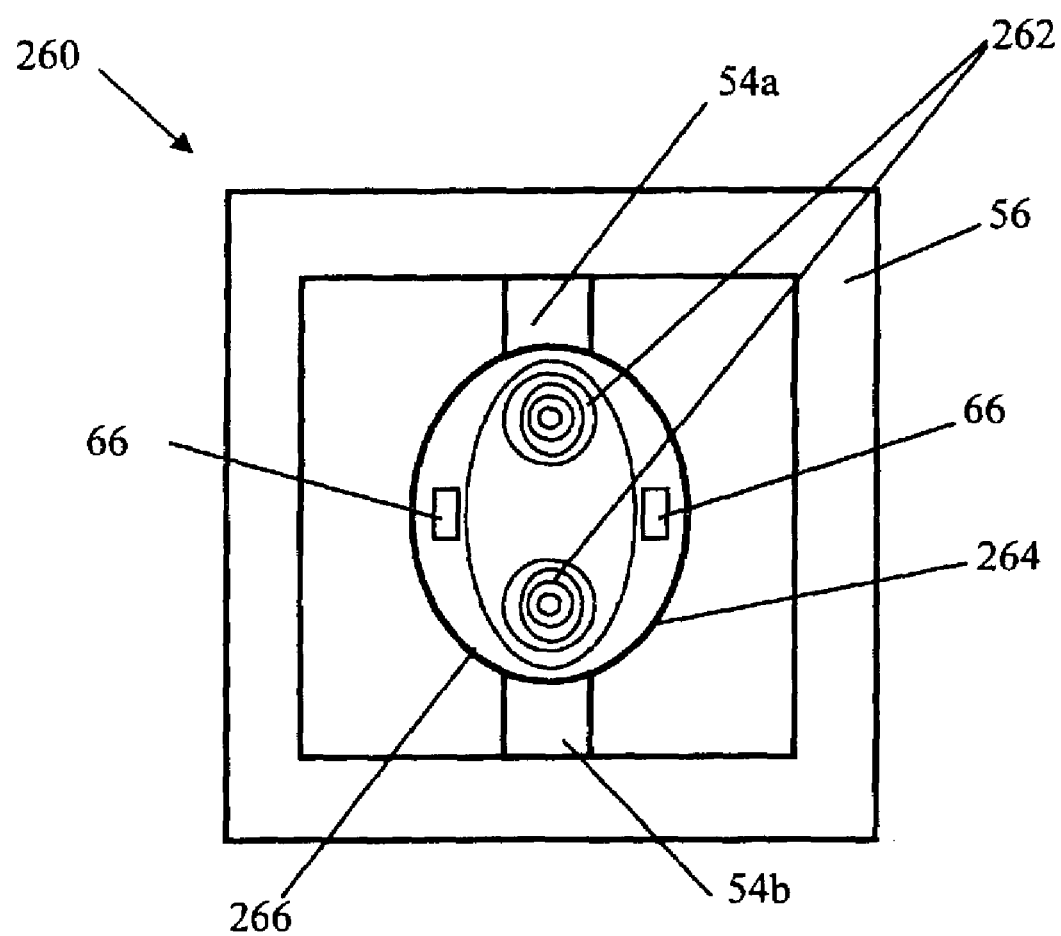
FIG. 21 is a somewhat schematic plan view of a torsion oscillator showing alternative reflective surfaces.

Referring now to FIG. 21, yet another embodiment of a torsion oscillator 260 is shown. As shown in FIG. 21, by locating the coil(s) away from the plate 264, one or more diffractive reflective surfaces 262 can be etched or otherwise fabricated as part of the reflective surface 266 on the plate 264. The one or more diffractive reflective surfaces 262 can include different diffractive properties to produce different reflective effects when an energy source is directed or scanned across the plate 264. The diffractive optical surfaces 262 can also provide optical power to the plate surface in addition to the reflective surface 266. Thus, it is possible to remove a lens from the system by providing optical power on the plate 264. For example, the diffractive reflective surfaces 262 may reflect light substantially like a concave mirror, which in a particular optical system may eliminate the need for one lens. Also, if desired, the mirrors 262 may be curved in a third dimension.

Single Sensor Laser Scanner

Figure 22:
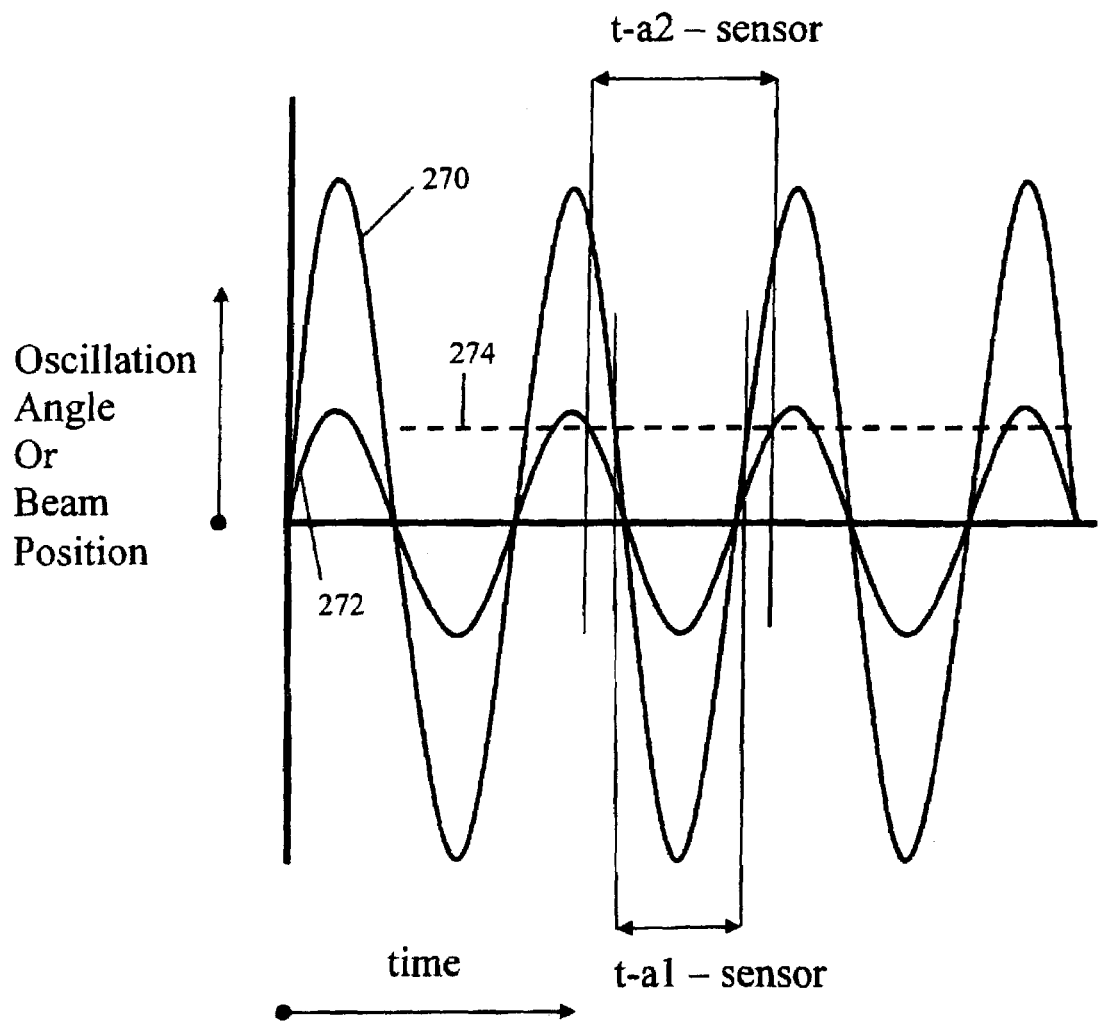
FIG. 22 is a graph of oscillation of a torsion oscillator or a laser scan at two amplitudes and one frequency.

In an alternative preferred embodiment of the present invention, the maximum oscillation amplitude may be determined by observing only one sensor signal. Referring to FIGS. 15, 11 and 22, it is appreciated that a single sensor, such as sensor A in FIG. 15, will create two pulses per oscillation cycle. As the amplitude of the oscillation increases, t0 and t2 will increase while t1 and t3 will decrease. For a given frequency, time intervals such as t0, t1, t2, or t3 are proportional (or inversely proportional) to amplitude. To determine a currently existing resonant frequency, the control logic 90 varies the electrical drive frequency and determines a maximum oscillation amplitude by determining the frequency at which t0 or t2 are greatest, or the frequency at which t1 or t3 is smallest. Such frequency is the currently existing resonant frequency. (Again, "or" is used as an inclusive logical operator in its broadest form.)

Referring to FIG. 22, there is shown a graph of two sinusoidal curves 270 and 272 representing the oscillation of oscillator 50 at two different amplitudes. The oscillation angle or beam position is shown on the Y axis and time is shown on the X axis. Line 274 represents the beam position at which sensor A, shown in FIG. 15, will sense the reflected light beam 152. Sensor A will generate two pulses per oscillation cycle of the oscillator 50. In FIG. 22, t-a1-sensor represents the time delay between the trailing pulse of sensor A and the next leading pulse of sensor A when the oscillator 50 is functioning as indicated by curve 270. t-a2-sensor illustrates the time delay between the trailing pulse generated by sensor A and the next leading pulse generated by sensor A when the oscillator 50 is functioning as indicated by curve 272. The curves 272 and 270 of FIG. 22 are grossly exaggerated to illustrate that when the amplitude of oscillation decreases, the time delay between the trailing pulse and the leading pulse of sensor A will increase dramatically. Thus, the time indicated by t-a1-sensor is dramatically smaller than t-a2-sensor. By observing this time delay, control logic 90 determines information corresponding to the amplitude of oscillation. Preferably, during a calibration process, a lookup table or formula is provided that will correlate the magnitude of this delay time, such as t-a1-sensor, to an oscillation amplitude such as that represented by curve 270 or to information corresponding to oscillation information. From FIG. 22 and FIG. 15, it will be appreciated that the times, t-a1-sensor and t-a2-sensor, each correspond to the sum of t1+t2+t3 shown in FIG. 15. Thus it is appreciated that the currently existing resonant frequency may be determined in a number of different ways, such as those described above, by varying the electrical drive frequency to the oscillator 50 and observing the amplitude of oscillation. For many applications, it is not necessary to physically calculate the currently existing resonant frequency. For example, for a known mechanical operating frequency of oscillation, the control logic 90 may observe t-a2-sensor and based on this time, change the electrical drive frequency without calculating the currently existing resonant frequency. The time delay, t-a2-sensor, in a sense represents the currently existing resonant frequency. The purpose and effect of changing the electrical drive frequency to place it near the currently existing resonant frequency may be accomplished without actually calculating the resonant frequency. Again, in a sense, the currently existing resonant frequency is indirectly observed.

Figure 23:
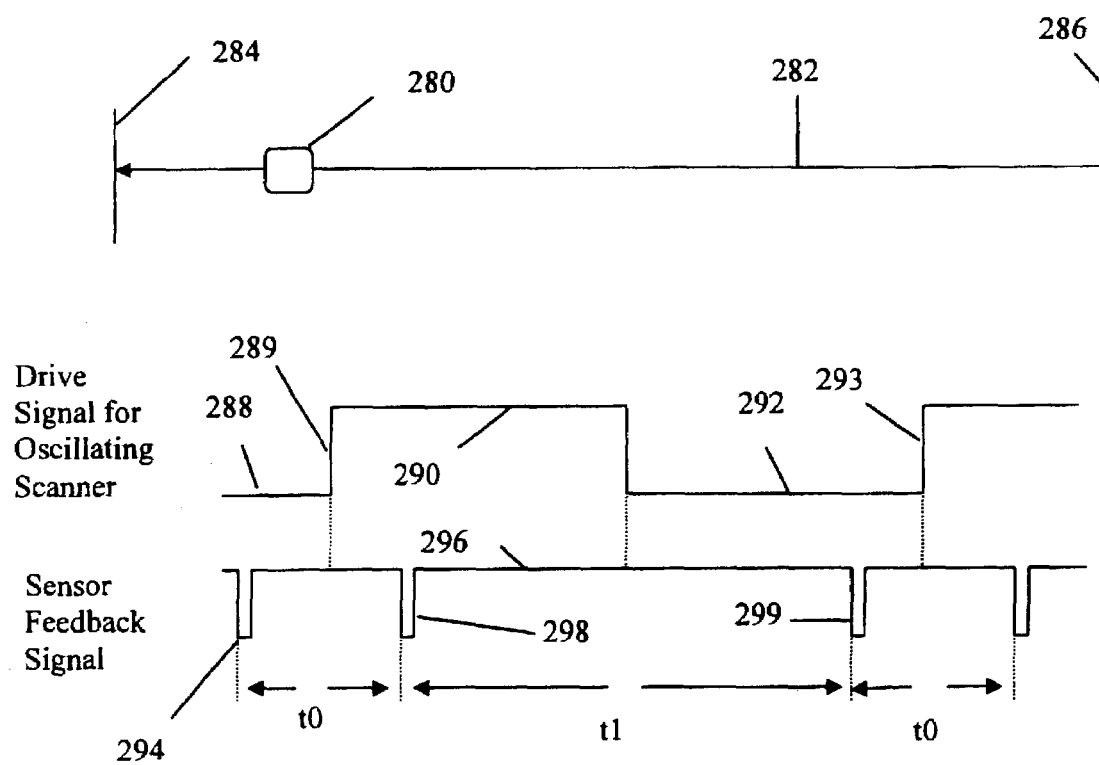
FIG. 23 is a diagram illustrating the interaction of a scanning laser and a sensor in accordance with an embodiment of the present invention.

A single sensor 280 may also be utilized to determine the direction and position of a scanning laser 78 such as that used in the embodiment of FIG. 9. FIG. 23 is a timing diagram that shows the operation of such an embodiment of the present invention wherein a single sensor 280 to determine the direction and position of the scanning laser 78 is shown. The embodiment uses a single sensor 280 placed along a scan path 282 of the scanning laser beam. The sensor 280 is placed closer to either the leftmost scan point 284 or the rightmost scan point 286 of the scan path 282. The reflective device 50 used to scan the laser beam is driven with a drive signal 288 that regularly oscillates between a high value 290 and a low value 292 The scanning of the laser beam along its scan path 282 causes the sensor 280 to produce a sensor feedback signal 294. For the sensor 280 shown in FIG. 23, this feedback signal 294 has a high value 296 when the sensor 280 does not detect the laser beam and a low value 298 when the sensor 280 detects the laser beam. However, it will be appreciated that the actual values of the feedback signal 294 will depend upon the particular type of sensor 280 used to detect the scanning laser beam.

A laser beam in an imaging system using an oscillating reflective device 50 as its scanning mechanism continuously sweeps back and forth through its scan as the reflective device oscillates. After sweeping the beam through its scan in one direction, the oscillating reflective device 50 sweeps the beam back across its scan in the opposite direction to position the beam at the start of the next scan. As previously discussed above, this back and forth sweeping causes the beam to pass a sensor 280 in its scan path twice per back and forth scan. However, if the imaging system utilizes a rotating polygon mirror scanner that causes the beam to jump from one end to the other, a sweep discontinuity is created whereby the sensor only detects the laser beam once per scan. Thus, the single sensor 280 located in the scan of the laser beam 84 depicted in FIG. 9 will be illuminated twice per scan if the means for sweeping the laser beam through its scan does so in a bi-directional manner rather than a uni-directional manner such as created by a rotating polygon mirror. Therefore, in such an embodiment, the sensor feedback signal 294 will detect the laser beam in intervals that are separated by a time span of either t0 or t1 as shown in FIG. 23. The time between the second sensor pulse of one scan and the first sensor pulse of the next scan is the time required for the laser to sweep in reverse from the from the sensor 280 out to the leftmost scan endpoint 284 and then forward back to the sensor 280. This is the time t0. The time interval between the first and second sensor pulses of a given scan is the time required for the beam to sweep forward across the imaging window out to the rightmost scan endpoint 286 and then back across the imaging window in reverse. This is the time interval t1. These differing time spans result from the sensor 280 being placed in a location on the scan path 282 that is offset from the center of the scan path 282. Thus, the time span t0 corresponds to the time between the laser beam passing the sensor 280 on its way to its leftmost endpoint 284 and then returning to the sensor 280, and the time span t1 corresponds to the time required for the scanning laser beam to move from the sensor 280 to the right most scan point 286 and back to the sensor 280. If the imaging window is centered in the scan path, the forward and reverse travel times are the same and the sensor is preferably placed just outside of one edge of the imaging window, t1 will be larger than t0 by twice the time required for the beam to transverse the imaging window. In such an imaging system, the system calculates the time required for the beam to sweep across the imaging window as (t1–t0)/2.

In order to send image data to a laser in a laser printer in an appropriate manner, the printer must know whether a given sensor pulse indicates that the beam is just starting a scan or that the beam is traveling in the opposite direction and therefore nearly finished with a scan. Placing the sensor 280 in an offset location from the center of the scan path allows the right/left direction of the movement of the laser beam to be determined by examining the time periods between the sensor's detecting the scanning laser beam. As previously discussed, two sensors could be used such that the direction of the laser beam's scan could be determined by examining which sensor is currently detecting the laser and which sensor previously detected the laser beam. However, adding a second sensor increases the cost of the imaging system and may be undesirable in embodiments that are directed toward cost-sensitive products such as laser printers.

For purposes of this discussion, the laser beam is said to be traveling forward when it sweeps across its scan from left to right and in reverse when its sweeps from right to left. The imaging window in an imaging system that sweeps the laser beam with an oscillating reflective device is typically centered in the middle of the scan path such that the forward travel time of the beam is nominally the same as the reverse travel time. If a positional feedback sensor is positioned such that it is not centered in the scan, the time interval between sensor pulses varies depending upon whether the sensor pulse was generated near the beginning or end of the scan. This difference in time periods can be used to determine the direction in which the scanning laser is moving. Thus, if the time period t0 is measured the laser beam is traveling in the forward direction immediately after the second pulse is detected. Similarly, if the time period t1 is measured, the laser beam is traveling in the reverse direction immediately after the second pulse is detected.

Figure 24:
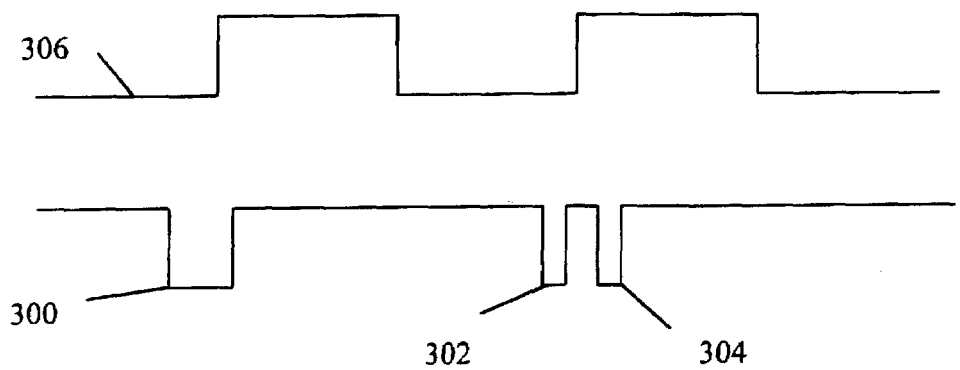
FIG. 24 is a diagram illustrating the relationship between the drive signal and feedback sensor signal of a device constructed in accordance with an embodiment of the present invention.

A resonant oscillating device operates efficiently at or very close to its resonant frequency. Consequently, a system utilizing a resonant oscillating device should search for the device's resonant frequency each time the device is started. When the resonant oscillating reflective device in a system such as that discussed with respect to FIG. 1 is first started, its angular deflection may not be large enough to sweep the laser beam across the sensor. The angular deflection increases as the drive frequency is brought closer to the resonant frequency causing the beam's scan to increase. At some point during the search for the resonant frequency, the angular deflection will be just enough to illuminate the sensor. At this point, the sensor may produce either one pulse 300 or two pulses 302 and 304 per scan at or near this particular drive signal 306 frequency. FIG. 24 illustrates this situation. Uncertainty in the number of sensor pulses per scan can lead to capture times that do not correctly indicate the time required for the beam to sweep through the corresponding physical interval. Consequently, the imaging system may falsely detect that it is at the resonant frequency unless it has a way to re-synchronize its interpretation of the capture values to the actual physical intervals they represent.

One method of avoiding this problem region is to design the imaging system such that it changes the frequency at which it drives the resonant oscillating reflective device by some relatively large amount once the angular deflection is large enough for the beam to produce two pulses per scan. This will push the drive frequency close enough to the resonant frequency such that the angular deflection of the oscillating reflective device will cause the beam to consistently produce two pulses per scan. The size of the frequency increase should be chosen with the variations in devices and operating conditions in mind. The frequency increase should be small enough that it will cause the drive frequency to be less than the resonant frequency in every different device in all practical or expected operating conditions. Or, the frequency increase should be large enough that the drive frequency is shifted to a frequency above the resonant frequency. If variation from one device to the next is such that a particular fixed change in drive frequency could push the frequency beyond the resonant frequency of some devices, and remain below the resonant frequency in other devices, such result could cause a subsequent search for the resonant frequency to fail. Thus, the size of the frequency increase will change depending on the application and the variance in the devices manufactured.

Referring to FIG. 23, in a preferred method of determining scan direction, even if the phase of the drive signals and sensor signals shift drastically. Thus, the first test is whether two sensor pulses are detected in one cycle of the drive signal, which may be determined by observing the time interval between a rising edge 289 of signal 288 and the next rising edge 293 and counting the number of pulses detected. If two pulses are detected, the direction of the scan may be determined by observing the time intervals t0, t1 and knowing where the sensor 280 is located. In FIG. 23, the forward direction is defined as moving from the leftmost side 284 to the rightmost side 286. Thus, the forward travel occurs after the occurrence of the smaller time interval t0, which means that the laser is traveling in the forward direction when pulse 298 is produced. The reverse travel occurs after the larger time interval t1 is produced, which means the laser is traveling in the reverse direction when pulse 299 is generated. These processes ensure the integrity of the data used to detect the resonant frequency and also allow the imaging system to know both beam position and direction of travel, both of which are helpful for proper imaging control.

Figure 25:
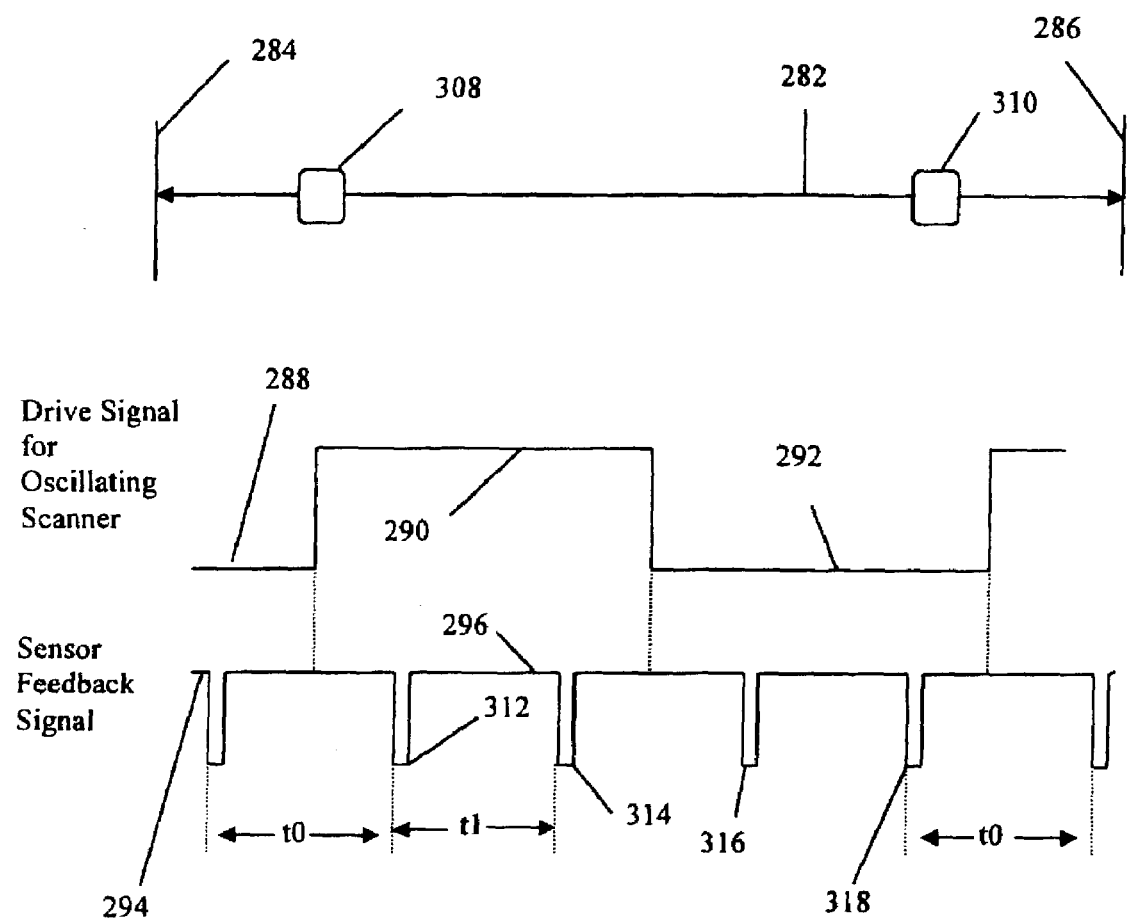
FIG. 25 is a diagram illustrating the interaction of a scanning laser and a sensor in accordance with an embodiment of the present invention that utilizes a reflecting mirror.

Some imaging systems may also require the ability to detect when the laser beam is at the end of the imaging window. Such information can be used to more accurately place the image data by allowing the imaging system to directly measure the time required for the beam to sweep across the imaging window. This additional beam position feedback information could also serve as a reverse start-of-image signal if the system is designed to image during both the forward and reverse portions of the scan. Such imaging systems can detect when the beam is at the end of the imaging window without the aid of another sensor 308 by adding a mirror 310 by which the beam is reflected back to the single positional feedback sensor 308. This configuration is shown in FIG. 25. Each scan will produce four sensor pulses 312, 314, 316 and 318 per scan in this configuration rather than two since the sensor 308 will be illuminated at both ends of the imaging window and the beam crosses the imaging window twice per scan.

Figure 26:
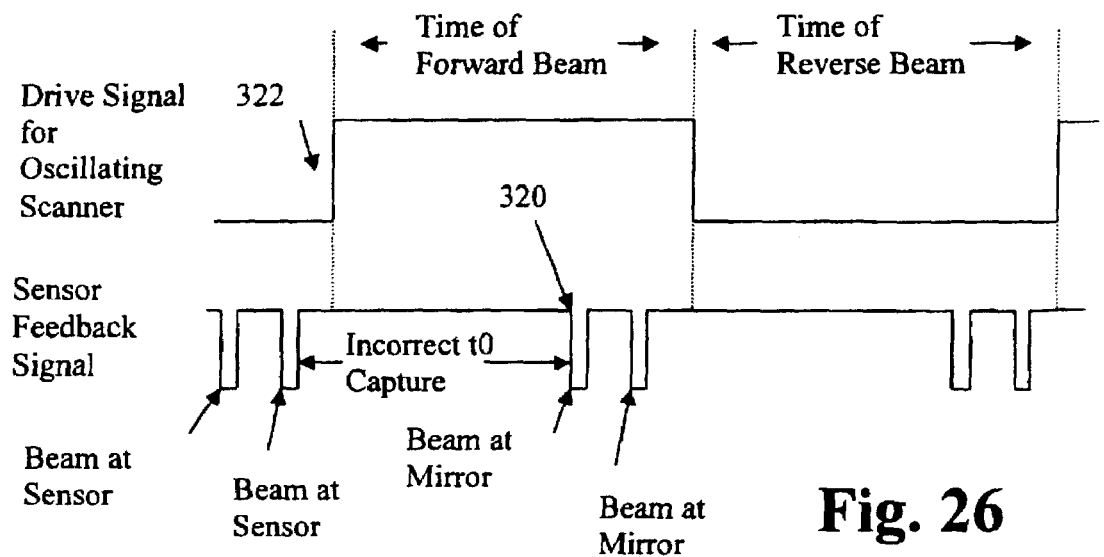
FIG. 26 is a diagram further illustrating the interaction of a scanning laser and a sensor in accordance with an embodiment of the present invention that utilizes a reflecting mirror.
Figure 35:
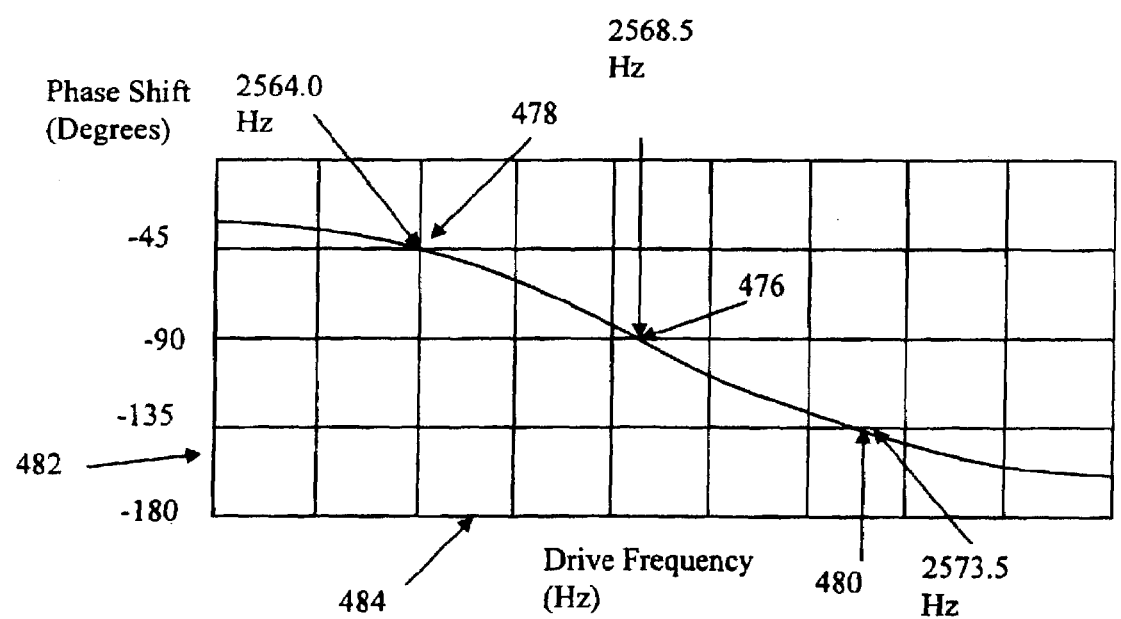
FIG. 35 is a graphic representation of the phase shifts in oscillation that occur around the resonant frequency of an oscillating scanner.

Correlating the sensor pulse capture times to the physical intervals of the scan is different when the sensor produces four pulses per scan because the asymmetry relied upon in the two pulse configuration may no longer be present. However, the sensor interval validation requirements of the two-pulse system can be extended to the four-pulse configuration. Thus, in such an embodiment, the imaging system normally receives four pulses per scan with two pulses occurring when the drive signal for the reflective device is high and two pulses occurring when the drive signal is low. However, such condition may not occur as the drive frequency changes during a search for resonant frequency due to phase shifts between the drive signal and the sensor signal. In any event, this information alone will not completely guarantee that each sensor pulse interval capture time can be associated with a particular physical portion of the scan. When the device is far from its resonant frequency, the first sensor pulse received after the rising edge of the drive signal, or falling edge depending upon the imaging system design, may be correctly interpreted as the pulse generated by the beam as its travels forward into the imaging window. But, when the resonant frequency search is in progress, the sensor pulses will not have the same phase relationship with the drive signal edges as that in the embodiment shown in FIG. 25. This is due to the phase shift exhibited by the device as the driving frequency approaches and then passes the resonant frequency of the device. This phase shift is shown in FIG. 35. In FIG. 26, the first sensor pulse 320 that occurs after the drive signal rising edge 322 is actually generated as the beam hits the mirror at the end of the imaging window. The capture times cannot be correlated to a particular physical interval or event in this situation without more information.

For correlating the capture times with particular physical intervals or events, the needed extra information may be obtained by observing changes in capture times as the drive frequency changes. The capture times associated with a given physical scan interval will either increase or decrease as the resonant oscillating reflective device, such as scanning member 336, (FIG. 27) is driven closer to its resonant frequency depending on the particular scan interval chosen. The imaging system can therefore ensure that an interval measurement corresponds to the assumed physical scan interval by performing a slope check on each interval measurement as the drive frequency changes during the search for the resonant frequency. For example, referring to FIG. 25, if the frequency of the drive signal is moving towards its resonant frequency, t0 should be increasing. To find t0, the processor 330, shown in FIG. 27, moves the frequency in a direction known to be towards the resonant frequency and time intervals between sensor pulses are measured. The time interval that is increasing is identified as t0 and the time interval that is decreasing is identified as t1. If the frequency is moving away from the resonant frequency, t0 should be decreasing. By adding this check to the other requirements previously mentioned for a four pulse configuration, the imaging system can validate the sensor pulse capture times. This validation ensures the integrity of the data used to detect resonant frequency and allows the imaging system to know both the beam position and direction of travel. This improves control of the imaging system.

Figure 27:
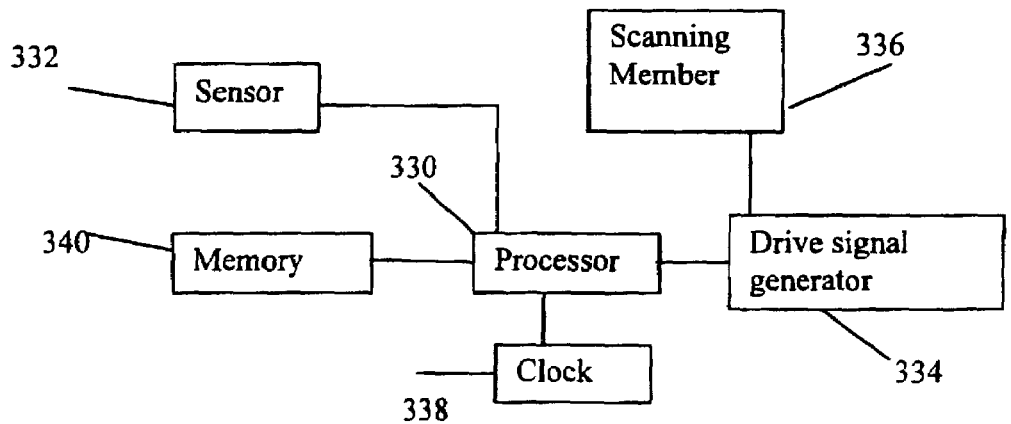
FIG. 27 is a block diagram of the components used to implement a preferred embodiment of the present invention.

A block diagram of the components needed to implement a preferred embodiment of the present invention utilizing a single sensor is shown in FIG. 27. A processor 330 may be one or more different logic devices, such as an ASIC or programmable logic, and it controls a drive signal generator 334. The drive signal generator 334 produces a drive signal that controls the motion of a scanning member 336. The processor 330 receives output pulses from a sensor 332 that is positioned along a scan path of the scanning member 336. The sensor 332 produces output pulses when the scanning member 336 scans across particular locations along its scan path. When the processor 330 detects an output pulse from the sensor 332, it records a corresponding time received from the clock 338. When the processor 330 receives another output pulse from the sensor 332, the processor examines the clock's 338 output and calculates the time interval between the received sensor pulses. After a number of iterations, two distinct alternating time intervals will become apparent. The actual time interval relationship will depend upon the particular construction of the device and can be determined experimentally and recorded in a memory 340. For example, one may determine that the first time interval after each rising edge of the drive signal is t0. By observing the time intervals themselves, two candidate time intervals can be selected as possible t0 intervals. By referencing the rising edge of the drive signal under known operating conditions, primarily known drive frequencies and amplitudes, the candidate t0 intervals can be narrowed to one, and the actual t0 is identified. The processor 330 can also examine the time intervals and compare them to a set of reference values in the memory 340 to determine whether or not the scanning member is operating at its resonant frequency. If it is not, the processor 330 can instruct the drive signal generator 334 to alter the frequency of the drive signal such that the scanning member 336 operates at its resonant frequency. Alternatively, the drive signal generator 334 can alter the amplitude of the drive signal to produce a scan path of a desired size.

Bi-Directional Printing

The scanning system of the present invention, such as shown in FIG. 9, 10, 13 or 12 for example, may be used in a bi-directional mode of operation. That is, the laser is turned on and functions in both directions as it moves through a scan path. In the bi-directional mode, it is preferred to use a system having two sensors, such as sensors A and B shown in FIG. 9, but a single sensor system may be used if desired. The bi-directional mode of operation is best understood by reference to FIGS. 28, 29 and 30 which graph scan angle (or scan position) versus time for a scanning a laser beam such as beam 152 (FIG. 13). Since the motion of the beam 152 and the oscillator 50 are proportional, these Figures may represent the motion of either or both.

Figure 28:
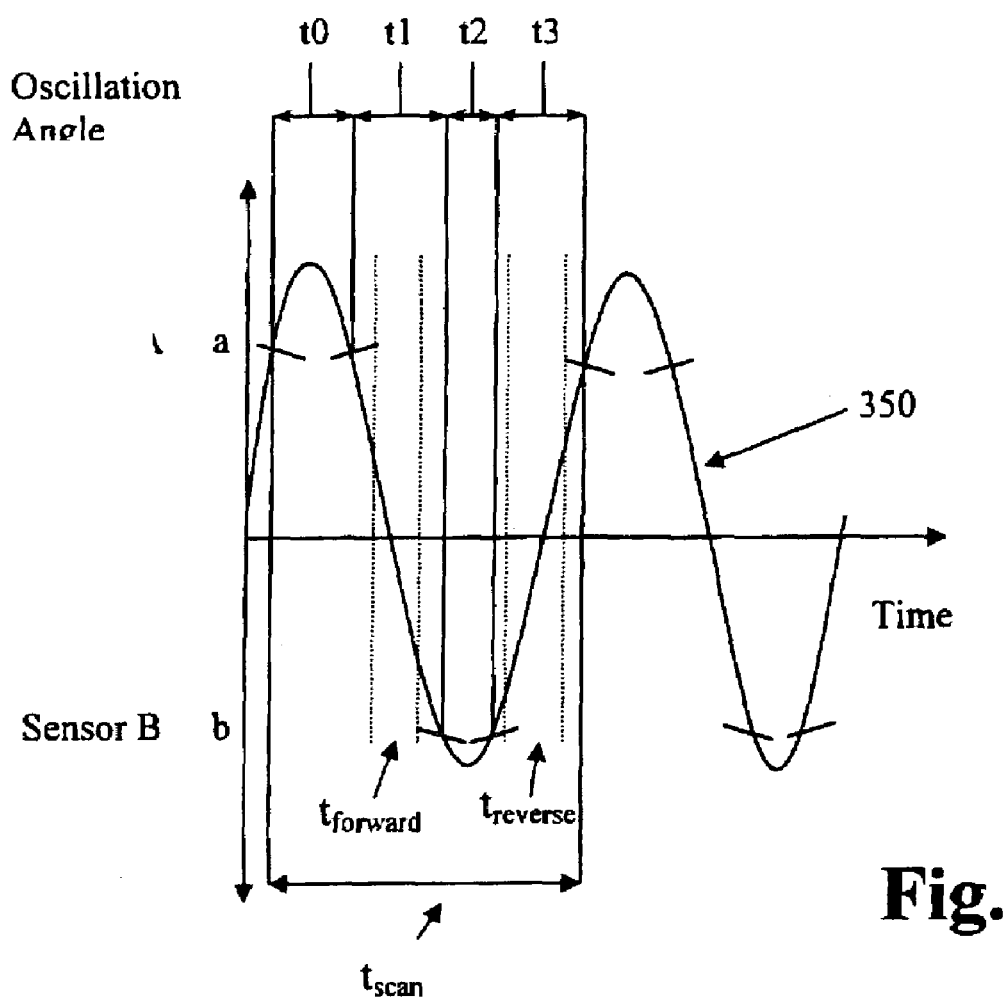
FIG. 28 is a graph that illustrates scan angle versus time for a torsion oscillator used in a bi-directional scanning system.
Figure 29:
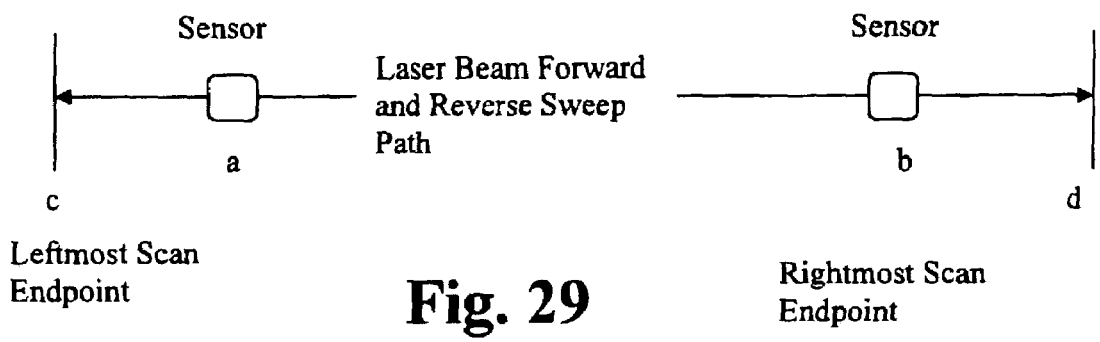
FIG. 29 schematically illustrates the forward and reverse scan paths of a scanning light beam.
Figure 30:
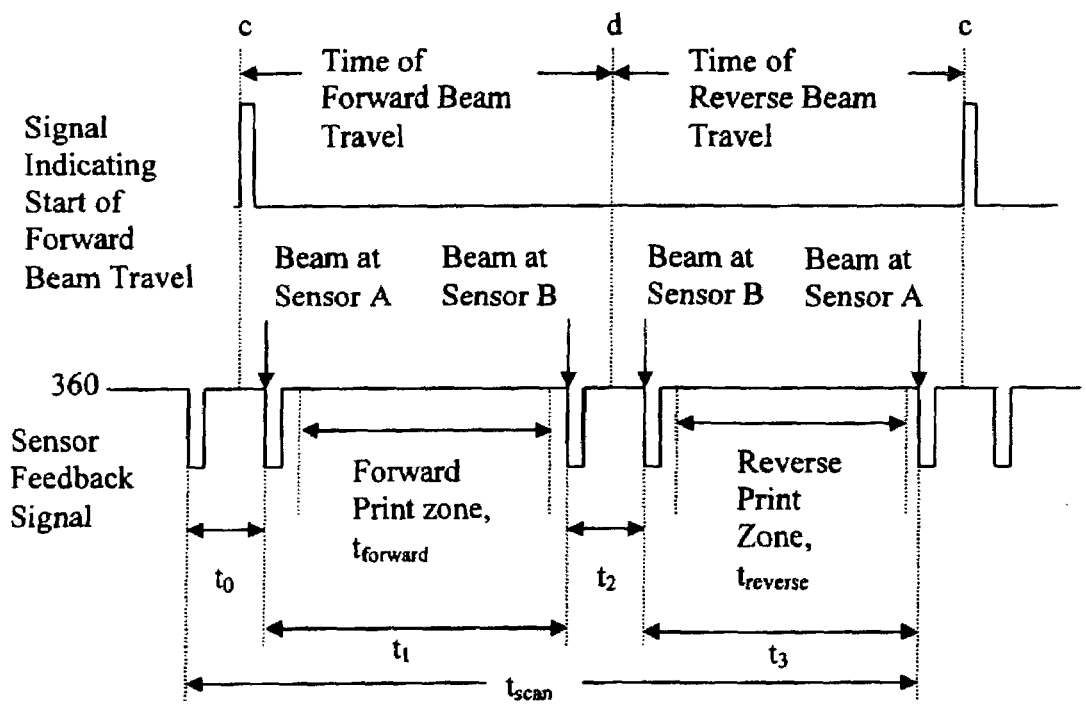
FIG. 30 illustrates a sensor feedback signal generated by sensors placed within the scanning path of the light beam of FIG. 29.

FIGS. 28, 29 and 30 are similar to FIGS. 15, 11, 22, 17, and 25, for example, and will not be described in detail to avoid repetition. FIG. 28 shows a sine wave representing oscillation of either laser beam 152 or oscillator 50. FIG. 29 is a schematic representation of a laser beam 152 sweeping through a scan across sensors A and B. FIG. 30 is a timing of diagram showing the time relationship between sensor feedback signals and signals indicating beam travel. In these figures, t-forward represents the forward print zones of the scanning laser beam 152 and t-reverse represents the reverse scan of the beam 152. The reverse operation that occurs during t-reverse is similar to the forward operation, except the data is reversed. For example, in a printing operation, the last pel is printed first and the first pel is printed last as the laser beam 152 scans in the reverse direction.

Referring to FIGS. 28, 29 and 30 simultaneously, for bidirectional printing, the laser beam travels across sensor A moving to the left until it reaches the leftmost scan endpoint. Beam 152 then travels from left to right and crosses sensor A at position a shown on FIG. 28, which creates a sensor pulse. The laser beam 152 then travels a short distance and reaches the beginning of the forward print zone. The time required to cross the forward print zone is designated as t-forward. Beam 152 then leaves the forward print zone and after a short distance, it crosses sensor B at position b shown on FIG. 28 and it continues its left to right travel until beam 152 reaches its rightmost position. The beam 152 then reverses its travel and moves right to left crossing sensor B again and then crossing the reverse print zone during the time period, t-reverse. The laser beam 152 then reaches sensor A and the cycle repeats. As the beam 152 crosses the forward and reverse print zones, it images or prints.

During a laser scan, preferably the time periods represented by the substantially linear regions (t-forward and t-reverse) are used for printing in the preferred embodiment resulting in less than half of the scan period (the time to complete one full laser scan) being used for printing. In other embodiments, t-forward and t-reverse may encompass times during which the curve 350 (FIG. 28) is not substantially linear. In such embodiment, a lens such as lens 150 (FIG. 13), may be used to create a substantially constant scan speed of laser beam 15 across the drum 96, for example. Using both the substantially linear and the non-linear portions of curve 350 allows greater scan efficiency, but the lens 150 becomes more difficult to design and more expensive. Even embodiments using a substantially linear portion of curve 350, a lens 150 is or may be used to correct for even slight non-linear sections and thereby create a constant speed scan of beam 152, but such lens is typically less difficult to design and less expensive.

The scan efficiency, $\eta$, is defined as the ratio of the usable print time (t-print) to the total scan time (t-scan). For imaging in only one scan direction of the light beam, the total usable print time will equal the forward print time (t-print=t-forward), and the scan efficiency, $\eta$, is approximately 25%. The scan efficiency of a rotating polygon mirror is typically in the range of 65%–75%. Since the scan efficiency of a galvo scanning system 154 (FIG. 13) during unidirectional printing is typically lower than the scan efficiency of a rotating polygon mirror, higher scan speeds and frequencies typically are required for the galvo scanner system 154 to achieve the same print speed in PPM as the rotating polygon mirror.

A galvo scanning system also typically requires a higher video data rate (approximately 3 times greater than a rotating polygon mirror) because a shorter window of time is available during each scan to write the latent image at the same number of scans per second. By printing in both scan directions, the usable print time per scan is approximately doubled resulting in an increase in the scan efficiency to approximately 50% in a typical embodiment and a reduction in the data rate requirements is achieved. Additionally, image control, or gray scale implementation, requires multiple slices per PEL which increases the required video data rate. Bi-directional printing reduces the required video data rate and doubles the image control capability as compared to a system utilizing uni-directional printing.

Generally, higher scan frequencies increase the difficulty of the galvo scanner design. As discussed above, the extensions 54*a*, 54*b* and plate 52 (FIG. 1) constitute a rotational spring-mass system with a specific resonant frequency. The resonant frequency of a galvo scanner including a torsion oscillator such as torsion oscillator 50 (FIG. 1), 64 (FIG. 2) or 70 (FIG. 5) is primarily a function of the size of mirror 60 and the extensions 54*a*, 54*b*. The mass of plate 52 is significantly affected by the size of mirror 60 and the torsion bar extensions 54*a*, 54*b* control the spring rate. For reliability, the torsion bar extensions 54*a*, 54*b* must be designed to stay within an acceptable limit of stress for a given maximum amplitude of rotation. However, the extensions 54*a*, 54*b* also need to possess increased stiffness to raise the resonant frequency of the galvo scanner thus achieving higher print speeds. Therefore, higher resonant frequencies tend to require lower total mechanical amplitude of oscillations from the torsion oscillator 50, 64 or 70 to keep the stress upon the extensions 54*a*, 54*b* at an acceptable level. Bi-directional printing reduces the required resonant frequency by approximately half to achieve the same print speed performance; thus it doubles the upper PPM (pages per minute) limit that the system can achieve with a given galvo scanner design.

Figure 31:
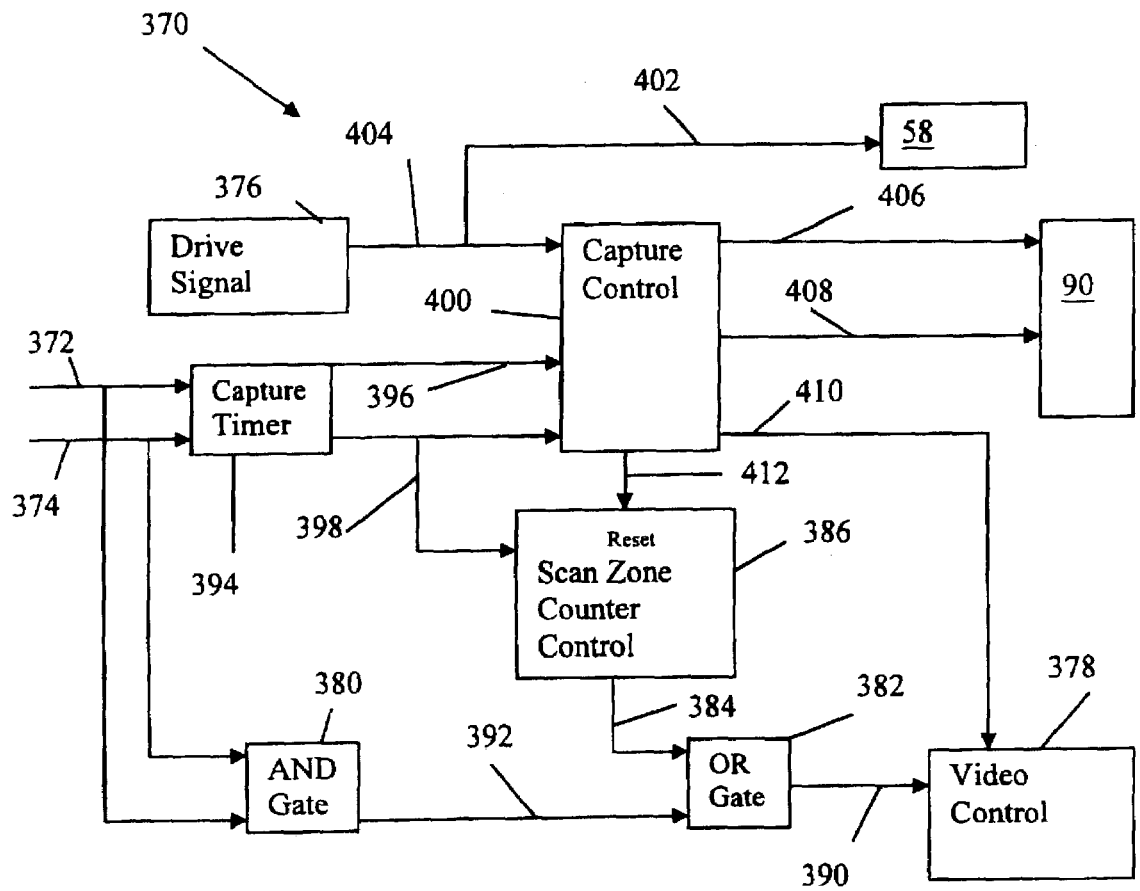
FIG. 31 is a block diagram of a control system for a bi-directional scanning system.

The operation of a bi-directional embodiment is illustrated in FIGS. 30 and 31. FIG. 30 illustrates the combined sensor feedback signals from sensors A and B as a function of time. In a preferred embodiment, either sensor A or B or both comprise a photodiode that is biased up in voltage. Preferably, the biased voltage (V-reference) is +5V or +3.3V. When the reflected light beam 152 travels over either sensor A or B, the voltage output of the sensor drops toward zero as shown in FIG. 30. In the alternative embodiment wherein sensor B comprises a mirror, the reflected light beam 152 is reflected by the mirror at location b to the sensor A and the voltage output of sensor A drops toward zero. Alternatively, sensor A could comprise a mirror while sensor B comprises another type of sensor such as a photodiode.

A signal indicating the start of forward beam travel (from point c toward point d in FIG. 29) is shown at the top of FIG. 30. The signal indicating the start of forward beam travel is preferably generated from the electrical drive signal to the coils 58 of the torsion oscillator 50, 64 or 70. When a forward electrical drive signal is sent to the coils 58, a signal is generated indicating the start of forward beam travel. Likewise, when a reverse electrical drive signal is sent to coils 58, a reverse drive signal is or may be created to indicate the start of reverse beam travel. In another embodiment, when two sensors A and B are used, direction of travel may be determined by the order of the signals from the two sensors, where A to B is one direction and B to A is the other.

FIG. 31 depicts a block diagram of the control logic 370 for bi-directional printing. The control logic 370 receives signals from sensors A and B and from a drive signal generator 376 and provides signals to Video Control 378 to control the timing of an imaging or printing function. In a preferred embodiment, the control logic 370 is included in control logic 90 and both may be implemented by a single microprocessor, although separate logic may also be employed. Also, in the preferred embodiment active low logic is used, meaning the occurrence of an event is signified by a signal going low, typically near zero. A sensor output on line 372, the horizontal synchronizing signal, HYSNC 1 from sensor A, and a sensor output on 374, HYSNC 2, a second horizontal synchronizing signal from sensor B, are combined in AND gate 380 to form the sensor feedback signal 360, also shown in FIG. 30. The sensor feedback signal 360 from the AND gate 380 is sent on line 392 into an OR gate 382 along with a SZCC signal on line 384 from a scan zone counter control (SZCC) circuit 386. The SZCC output signal on line 384 equals V-reference when the next sensor pulse should not trigger a scan. For instance, referring to FIG. 13, when the reflected light beam 152 is traveling from sensor B2 to sensor A2, the next sensor pulse will occur when the reflected light beam 152 crosses sensor A2. This sensor pulse should not trigger the reflected light beam 152 to scan the print data (such as from the RIP buffer shown in 388 FIG. 32) because the reflected light beam 152 is traveling toward endpoint c and is not within the linear print zone, t-forward. When the SZCC output signal on line 384 is V-reference, the output 390 of the OR gate 382 is also V-reference even when the next sensor pulse arrives on line 392. Thus, as the next sensor pulse sends the sensor feedback signal on line 392 near zero volts, the SZCC output signal 384 stays at V-reference and the resulting output 390 from the OR gate 382 also remains at V-reference.

The SZCC output signal 384 is driven low (near zero volts) when the next sensor pulse is received to thereby to scan the print data from the RIP buffer 388. To continue the example from above, as the reflected light beam 152 travels from sensor A at location a to the scan endpoint c and reverses scan direction back toward sensor A, the next sensor pulse (when the reflected light beam crosses sensor A) should trigger the reflected light beam 152 to scan the print data from the RIP buffer 388 because the reflected light beam 152 is about to enter the forward print zone represented by the time period t-forward. The next sensor pulse from the sensor feedback signal on line 392 will be near zero volts and the SZCC output signal 384 will be low, and the output 390 of the OR gate 382 is then also low (near zero volts), which is a signal to begin imaging or printing.

The output 390 of the OR gate 382 is transmitted to a video control 378. Preferably, the video control 378 is active low logic so a falling edge is interpreted by the video control 378 as an HSYNC (horizontal synchronizing) signal. An HSYNC starts the data output from the RIP buffer 388 after an appropriate time delay equal to the time, for example, from the beginning of the t1 zone to the start of the t-forward zone (referred to as t-delay forward). Similarly, the time delay in the reverse direction may equal the time difference between the beginning of the t3 zone and the start of the t-reverse zone (t-delay reverse). It is also understood that t-delay forward and t-delay reverse may comprise values which result in the print data being written from the RIP buffer 388 at various times after the reflected light beam 152 enters into either time period t-forward or t-reverse. Thus, t-delay forward and t-delay reverse may be used to achieve various desired print characteristics such as margin control. To successfully align the margins for each scan direction in bi-directional printing, t-delay forward for scanning and writing the print data in the forward direction can be set to a different value than t-delay reverse for scanning and writing the print data in the reverse direction. Varying t-delay forward from t-delay reverse also corrects for variance in offset, or other lack of symmetry in the torsion oscillator scan shape.

For uni-directional printing, the RIP buffer 388 is loaded in conventional fashion with each line having the same scan direction. In unidirectional printing, the only sensor pulse which should trigger the writing of the print data is the sensor pulse at the end of the t0 region when the reflected light beam 152 passes sensor A going into the forward print zone. In this embodiment, the SZCC output on line 384 remains at V-reference until the next sensor pulse is generated at the end of the t0 region as described above. After the reflected light beam 152 has passed sensor A and is traveling toward scan endpoint c but prior to the reflected light beam 152 passing sensor A again, the SZCC output 384 is driven low. Thus, as the next sensor pulse is transmitted as a sensor feedback signal on line 392 (when the reflected light beam 152 passes sensor A again) to the OR gate 382, the output 390 of the OR gate 382 goes low and an HSYNC signal is generated directing the reflected light beam 152 to begin writing the print data from the RIP buffer after the time delay, t-delay forward. Only the t-delay forward value is needed for unidirectional printing. To print bi-directionally, during both t-forward and t-reverse, the print data is loaded in the RIP buffer with alternate lines in opposite directions so that the final imaging is correctly arranged during bidirectional printing.

Figure 32:
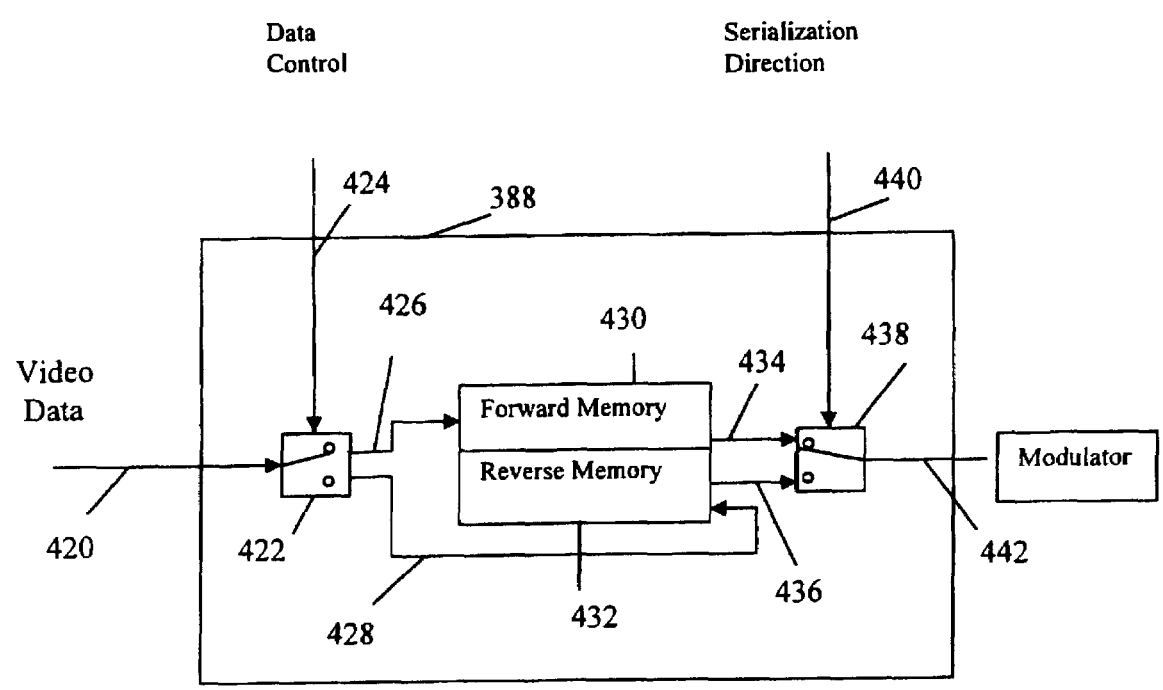
FIG. 32 is a schematic drawing of a preferred RIP buffer.

Referring to FIG. 32, one form of a RIP buffer 388 is schematically shown. Preferably the RIP buffer 388 is part of the video control 378. Video data is introduced on line 420 and is received by a switch 422 within the buffer 388. The switch 422 is controlled by a data control signal received on line 424 and is produced by the video control 378. When the forward video data is being received, the switch 422 directs the data through line 426 and when reverse video data is received, the switch 422 directs the video data through line 428. Forward memory 430 is connected to line 426 to receive the forward video data and a reverse memory 432 is connected to reverse memory line 428 to receive the reverse video data. In FIG. 32, line 428 is shown connected to the opposite end of the memory 432 as compared to memory 430 and line 426. This feature graphically illustrates that reverse video data is stored in the reverse memory 432 in a reverse order as compared to data in memory 430. Data is read from the memories 430 and 432 through lines 434 and 436 under the control of switch 438. A serialization direction signal is supplied on line 440 to actuate the switch 438, which causes the buffer 388 to write either the forward video data or the reverse video data. When switch 438 is connected to line 434, the output signal on line 442 is the forward video data. Likewise, when switch 438 is connected to line 436, the reverse video data is written on line 442. Since the video data in the reverse memory 432 was stored in reverse order, it is written in reverse order on line 442 and is printed in reverse order during the reverse beam travel indicated by t-reverse. It should be understood that FIG. 32 is a somewhat schematic graphical representation of buffer 388 designed to illustrate the principles of this embodiment. The buffer 388 could be implemented differently in different embodiments. For example, buffer 388 could have one memory that is used serially to hold both forward and reverse data with the reverse data being written in reverse order. In another embodiment, one or two memories maybe used and the reverse data is stored in memory in the same order as the forward data, but it is retrieved from memory in a reverse order.

In an alternative embodiment, the input lines 372 and 374 (outputs of sensors A and B respectively) are connected together. The AND gate is eliminated and one less input is required to a capture timer logic 394. This embodiment results in fewer conductors and lower cost cabling.

In another embodiment, one sensor comprises a mirror. Either sensor A or sensor B could comprise a mirror, but for purposes of illustration sensor B comprises the mirror. As the reflected light beam 152 passes over sensor B, the mirror reflects the light beam 152 to sensor A. The resulting output of sensor A is the same combined sensor feedback signal shown in FIG. 30 with the same information content. Again, the AND gate is eliminated and the sensor cost is cut in half.

Still referring to FIG. 31, the inputs 372 and 374 (generated from any of the embodiments discussed above) are also fed into a capture timer logic 394. Capture timer logic 394 counts each of the time intervals t0, t1, t2, and t3 shown in FIGS. 28 and 30. When the reflected light beam 152 travels over sensor A or sensor B the capture timer logic 394 receives a falling edge, as shown in FIG. 30 and stops a time count in progress. Timer logic 394 then transmits the time count through capture timer output signal 396 and transmits a signal 398 indicating it is transmitting a new capture. Thus, each time the next sensor feedback pulse is received by capture timer logic 394, the new capture signal on line 398 is toggled.

In the preferred embodiment, the capture timer logic 394 does not recognize which time interval has been measured (either t0, t1, t2, or t3). As shown in FIG. 31, a capture control logic 400 receives the information content of a drive signal generator 376 through line 404. One function of capture control logic 400 is to generate a capture error signal on line 406 and capture time signals for each sensor interval signal on line 408. Although the signals on lines 406 and 408 are shown as transmitted to control logic 90 in FIG. 31, it is understood that all of the components of FIG. 31 may be contained within control logic 90 or may be external to control logic 90.

The capture control logic 400 also uses the information content of the drive signal 404 from the drive signal generator 376 to generate direction information needed for either bi-directional or uni-directional printing. The direction information (forward or reverse) is used to provide the SZCC output signal on line 384 (which synchronizes the output on line 390 of the OR gate 382 with the start of forward or reverse scan direction) and is used to generate a serialization direction signal on line 410 to transmit to the video control 378 for determining forward or reverse serialization direction from the RIP buffer 388.

In one embodiment, the drive signal generator 376 provides a square wave signal on line 404 to drive the current to the coils 58 of the torsion oscillator 50, 64 or 70 such that half of the square wave (e.g. the positive half) drives the torsion oscillator 50, 64 or 70 in one direction, for example the forward direction, and the other half (e.g. the negative half) of the square wave signal drives the torsion oscillator 50, 64 or 70 in the opposite direction. The capture control logic 400 detects a rising or falling edge of the square wave drive signal 404, whichever corresponds to the start of forward direction of travel of the torsion oscillator 50, 64 or 70, and generates a start forward travel signal on line 412, indicating start of forward beam travel also shown in FIG. 30. As previously discussed with regard to the embodiment of FIG. 25, one may not assume that a rising edge of the drive signal 404 indicates that the oscillator 50, 64 or 70 is moving in the forward direction. However, by analyzing the time intervals themselves and using empirically determined relationships between the time intervals and the drive signal 404, the capture control logic may determine which pulse is the first pulse in the forward travel of the laser. This method was discussed above. The capture control logic 400 uses the same method as described above to determine the first sensor pulse occurring while the laser is moving in the forward direction.

The start forward travel signal on line 412 is sent to the SZCC 386 and is also used within the capture control logic 400 to reset a counter that counts new captures. The first and second new captures after the start of forward travel correspond to the forward direction part of the scan (as the reflected light beam passes over sensor A and sensor B as denoted by time period t1) and the third and fourth new captures correspond to the reverse direction of the scan (as the reflected light beam again passes over sensor B and then sensor A as denoted by time period t3).

For bi-directional printing, the serialization direction signal on line 410 is provided to the video control 378 to control the direction of data from the RIP buffer 388 (to ensure correct alignment of the print data). The serialization direction signal is set high for the first and second new captures (denoting forward beam travel) and is set low for the third and fourth new captures (signaling reverse beam travel). For uni-directional, printing, the serialization direction signal on line 410 is in one orientation (high for example) as the direction of serialization of the RIP buffer is the same in uni-directional scanning.

In an alternative embodiment, the drive signal generator 376 generates the start of forward beam travel signal 412 as described in the embodiment above. Instead of counting new captures to toggle the serialization direction signal on line 410 to the video control 378, the drive signal 404 can be buffered and sent either directly or as its logical inverse (depending upon the forward and reverse sign convention of the torsion oscillator 50, 64 or 70) as the serialization direction signal 410 to the video control 378.

In another embodiment, sensor A and sensor B generate separate HSYNCN1 and HYSNCN2 signals on lines 372 and 374 respectively and the capture control logic 400 determines the start of forward travel by recognizing which sensor (either A or B) is generating which time intervals. For example, sensor A generates HYSNCN1 at the start of time periods t1 and t0 while sensor B generates HSYNCN2 at the start of time periods t2 and t3. By comparing the time intervals t0 and t1 from HSYNCN1 and determining the smaller interval, the capture control logic recognizes that essentially half the time of the smaller time interval (t0/2) after the start of the time interval t0 is the start of forward travel. At approximately half the time of the smaller time interval (t0/2), the reflected light beam 152 has reached the scan endpoint c and is reversing scan direction to begin the forward beam travel. Therefore, the capture control logic 400 can generate the start of forward beam travel signal 412 to be sent to SZCC 386. The serialization direction signal 410 provided to the video control 378 to control the direction of serialization of the data of RIP buffer 388 is generated in the same manner as discussed above.

Referring to FIG. 31, the start forward travel signal on line 412 and the new capture signal on line 398 are input into the scan zone counter control (SZCC) 386 to generate the SZCC output signal on line 384. The SZCC output signal 384 is based upon whether a bi-directional enable (BIDI-enable) signal on line 412 to SZCC 386 is high or low. If the bi-directional enable signal is high, bi-directional printing is desired, and if it is low, uni-directional printing is desired. When a start forward travel signal on line 412 is received by the SZCC 386, the SZCC 386 is reset and the SZCC output signal 384 is set to voltage low. At this time, the sensor feedback signal on line 392 is at V-reference, and the output signal 390 of the OR gate 382 remains at V-reference until the next sensor feedback signal on line 392 goes low and indicates a falling edge to the OR gate 382. When sensor feedback signal 392 indicates a falling edge (the reflected light beam 152 passes a sensor and generates a falling voltage signal), the suppress HSYNC signal on line 384 is set low and the low signal on line 392 is allowed to pass through the OR gate 382 to become the output signal on line 390 (low) which is transmitted to the video control 378 indicating that the reflected light beam 152 should write the print data from the RIP buffer 388 after t-delay forward. This signals the start of the time interval t1 that is the desired zone for forward printing. The SZCC 386 then counts new capture toggles through new capture signal on line 398, and the SZCC output signal on line 384 is reset to V-reference to ensure that the sensor feedback signal 392 at the end of the t1 interval (which would be low because the reflected light beam passed sensor B) is not passed through as the output signal on line 390 of the OR gate 382 and is not passed to the video control 378.

If the bi-directional enable logic line 424 is high, after the second new capture pulse is received by the SZCC 386, the SZCC output signal on line 384 is set to voltage low. As the reflected light beam passes sensor B at the start of interval t3 during reverse beam travel, the next sensor feedback signal 392 indicating a falling edge arrives at the OR gate 382 and is allowed to pass through as the output signal on line 390 of the OR gate 382 and is allowed to pass to the video control 378. This signals the start of the time interval t3 and indicates that the reflected light beam 152 should write the print data from the RIP buffer 388 in the reverse scanning direction. Correct alignment of the data in reverse order is assured through the serialization direction signal 410.

If the bi-directional enable logic line 424 is low, when a start of forward beam travel signal 412 is received by the SZCC 386, the SZCC 386 is reset and the SZCC output signal on line 384 is set to voltage low. After the SZCC 386 is reset, when the first new capture pulse is received by the SZCC 386, the SZCC output signal 384 is set to V-reference as in the case of bi-directional printing described above, but the SZCC output signal remains at V-reference through the reverse travel region. Therefore, only the first sensor feedback signal on line 392 indicating a falling edge that arrives at the OR gate 382 is allowed to pass through as the output signal on line 390 of the OR gate 382 to the video control 378. This signals the start of the time interval t1 that is the desired zone for forward printing only.

In an alternate embodiment, it is recognized that bidirectional printing may be implemented in single sensor embodiments. FIG. 30 illustrates a two sensor embodiment, but it may be referenced to understand a one sensor embodiment. Referring to FIG. 30, when a single sensor is used, such as sensor A, a sensor input signal will be received only twice per cycle. Thus, the sensor signals that are labeled "beam at sensor B" will not be present in a single sensor embodiment. Thus, in a single sensor embodiment both the forward print window and the reverse print window are located based on a known time delay after t0. The start of the forward print window is determined to be t-delay after t0. The start of the reverse print delay will change with changing operating conditions. During a calibration process, a lookup table is created and stored in memory to provide a plurality of different forward and reverse time delays that were empirically determined for a plurality of different operating conditions. Referring to the discussion above in connection with FIG. 22, it will be recalled that the amplitude and frequency of a curve representing a laser scan pattern may be determined using a single sensor. Once the curve is known, the reverse print time delay may be calculated.

The dynamic physical offset, which was discussed in connection with FIG. 17 complicates the calculation of the reverse time delay. However, once the offset, and t0, t-total are known, the reverse print time delay may be calculated with precision. However, from a practical standpoint, a lookup table is provided during a calibration process, and the lookup table correlates t0, t-total, and the reverse time delay. Thus, the control logic 90 determines the forward and reverse time delays by determining t0 and t-total and looking up the forward and reverse time delays in the table.

The two-sensor embodiment is preferred over the single sensor embodiment because it is believed to be more stable. Also, the two-sensor embodiment provides a level of redundancy. If one sensor of a two sensor system is malfunctioning, such as by providing pulses at odd times, the control logic 90 may detect the malfunctioning sensor by comparing it to the properly functioning sensor. In addition, once the malfunctioning sensor is identified, it may be disabled and the other sensor may be used to continue printing in both unidirectional and bi-directional modes using the procedures described above.

Use of Multiple Oscillators Operating in Tandem

Figure 33:
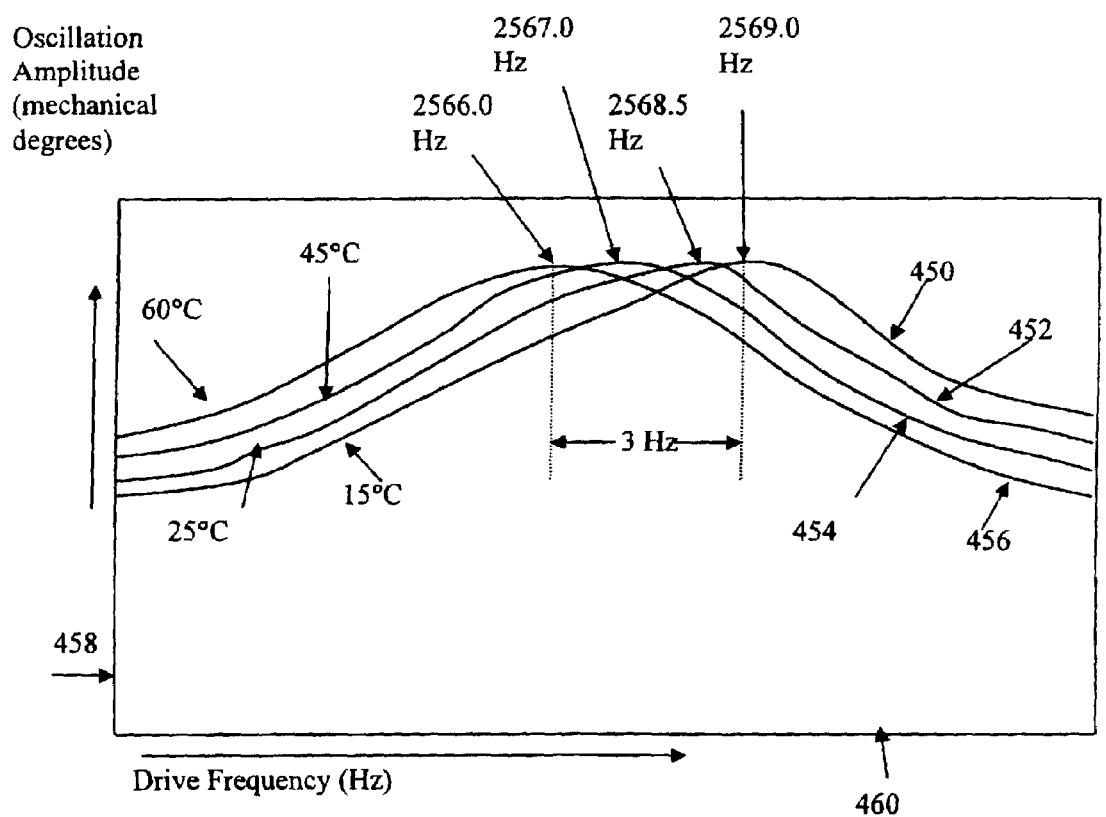
FIG. 33 is a graphic representation of four frequency responses of the scan amplitude of an oscillating scanner operating at four different temperatures.

As discussed in some detail above, the highest scan amplitude for a given drive signal level, and therefore the most efficient way to excite and operate an oscillator such as the torsion oscillator 50 occurs at the resonant frequency of the device. This is because the oscillator 50 is an underdamped second order electromechanical bandpass filter for the drive signal entering it. Furthermore, as generally discussed with respect to FIG. 8, the resonant frequency of a device varies with a number of conditions such as temperature. More particularly, FIG. 33 shows four graphs 450, 452, 454 and 456 of a scan amplitude 458 in degrees versus drive frequency 460 in Hertz for a particular oscillator 50 and laser 78 at four different temperatures. In this very lightly damped device, drive frequencies higher or lower than the resonant frequencies cause inefficiency and, thus, the scan amplitude 458 quickly deteriorates. The four graphs 450, 452, 454 and 456 respectively correspond to the scan amplitude 458 versus the drive frequency 460 for the oscillating scanner at four different temperatures of 15° C., 25° C., 45° C., and 60° C. The graph 450 shows that the maximum scan amplitude at 15° C. occurs at 2569 Hz for the particular oscillating scanner of FIG. 33. The frequency that corresponds to the maximum scan amplitude is the resonant frequency of the oscillating scanner. If the drive frequency 460 moves away from the resonant frequency, the scan amplitude 458 of the graph 450 decreases. Thus, for a drive signal having a constant drive level, the maximum scan amplitude occurs at the resonant frequency of the oscillator 50.

The graph 452 showing the relationship between the scan amplitude 458 and drive frequency 460 when the oscillating device is at 25° C. illustrates that the resonant frequency is at 2568.5 Hz when the temperature of the device is 25° C. Thus, as the oscillating device warms from 15° C. to 25° C., the resonant frequency of the device falls 0.5 Hz from 2569 Hz to 2568.5 Hz. This relationship is further illustrated by graphs 454 and 456 that show that as the temperature rises from 25° C. to 45° C. and then from 45° C. to 60° C., the resonant frequency drops from 2568.5 Hz, to 2567 Hz, to 2566 Hz respectively. Thus, for the oscillator 50 of FIG. 9, the resonant frequency of the oscillating scanner drops as its temperature increases.

Figure 34:
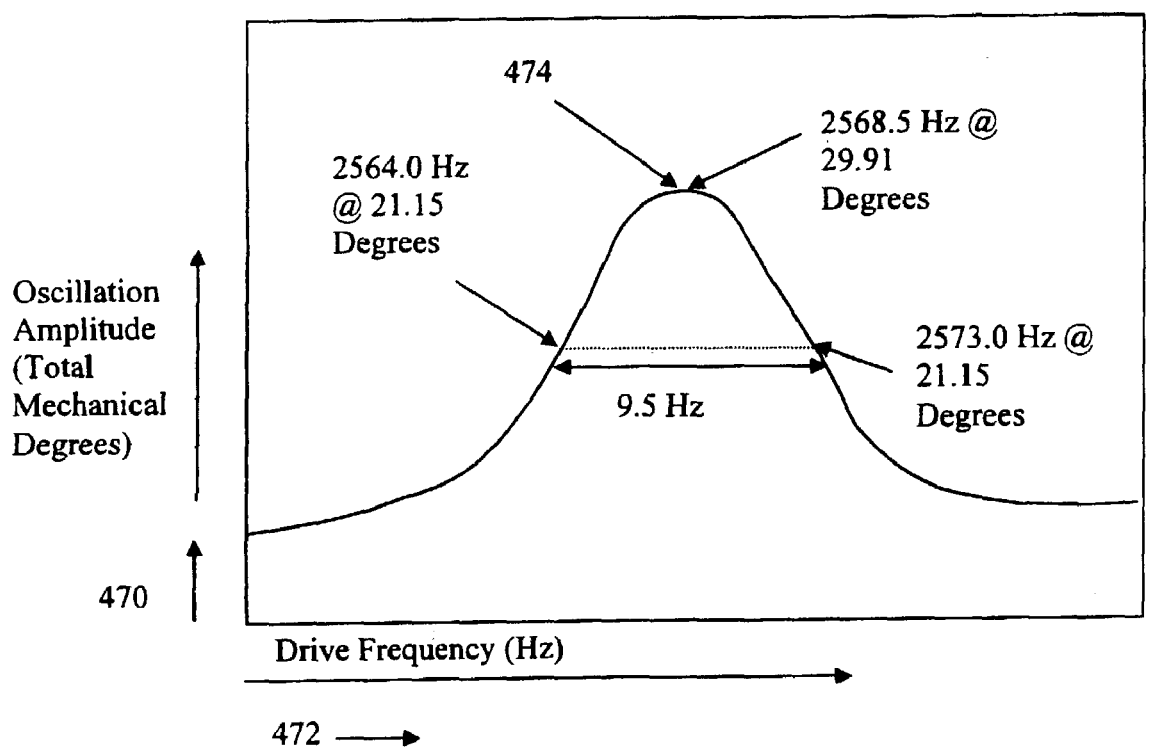
FIG. 34 is a graphic representation of variations in the scan amplitude of an oscillating scanner with respect to changes in the drive frequency that illustrates an effective bandwidth of an oscillating scanner.

Referring now to FIG. 34, a graph showing an operating bandwidth for a preferred embodiment of the present invention is shown. The graph illustrates the scan amplitude 470 versus the drive frequency 472 for an exemplary oscillator 50 of FIG. 9. The resonant frequency 474 of the oscillator 50 occurs at 2568.5 Hz at which point the scan amplitude 470 is equal to approximately 29.91 degrees. When the drive frequency 472 drops to 2564 Hz., the scan amplitude 470 drops to 21.15 degrees. Likewise, when the drive frequency 472 rises to 2573.5 Hz., the scan amplitude 470 drops to 21.15 degrees. This illustrates that a sufficient scan amplitude can be generated by an oscillator 50 when the frequency of the electrical drive signal is varied plus or minus 4.75 Hz from the resonant frequency of 2568 Hz for a given oscillator 50. When driven up to 4.75 Hz away from the resonant frequency, the amplitude of the scan oscillation is reduced by about 30%. However, compensation for this reduction in the scan amplitude of the oscillating scanner is achieved by increasing the amplitude of the drive signal by approximately 41%. Thus, a properly designed resonant oscillator 50 in accordance with a preferred embodiment of the present invention has an appropriately wide operating bandwidth that is defined as an approximately 30% amplitude reduction over a 9.5 Hz bandwidth. This allows scan amplitude compensation for drive frequencies other than resonant frequency to be accomplished by adjusting the amplitude of the drive signal to reasonable drive levels. Consequently, multiple scanners with differing oscillating frequencies due either to device specific properties or through variations in environmental conditions can be sufficiently matched by driving all the devices to a single nominal frequency or sufficiently narrow band of frequencies and adjusting the amplitude of the drive signals provided to each scanner as needed. Thus, the entire set of grouped oscillating scanners now acts as one scanner at the common reference frequency selected for that printer.

Optical compensation for the operating conditions may also be used. For example, once the operating characteristics of a particular oscillator is known, a lens may be chosen to optimize efficient operation and frequency range of the oscillator.

Referring now to FIG. 35, a graphic representation of the phase shift between the drive signal and the scanning member that occurs around the resonant frequency 476 is shown. The phase shift 482 between the oscillating scanner and the drive signal and is shown on the y-axis in degrees and the drive frequency 484 is shown on the x-axis in Hertz. Because of these phase shifts, preferred embodiments of the present invention utilize independent phase control of each oscillator 50. The edges 478 and 480 of the bandwidth of the oscillator 50 indicate that the lowest frequency 478 in the bandwidth corresponds to a minus 45 degree shift from the resonant frequency 476 and the highest frequency 480 corresponds to a minus 135 degree shift from the resonant frequency 476. Thus, if amplitude adjustment of the drive signal is implemented as discussed above, phase adjustment of the drive signals is also preferably implemented to ensure that the oscillating scanners are operating in tandem. Phase adjustment can be used to implement a partial pel process adjustment of registration among color planes. Usually, phase adjustment is performed to achieve equal phase relationships between the oscillating scanners, but one may also adjust phase to achieve a desired relationship between the phases of the individual scanners. In some applications, a phase shift between the oscillating scanners may be desirable.

Figure 36:
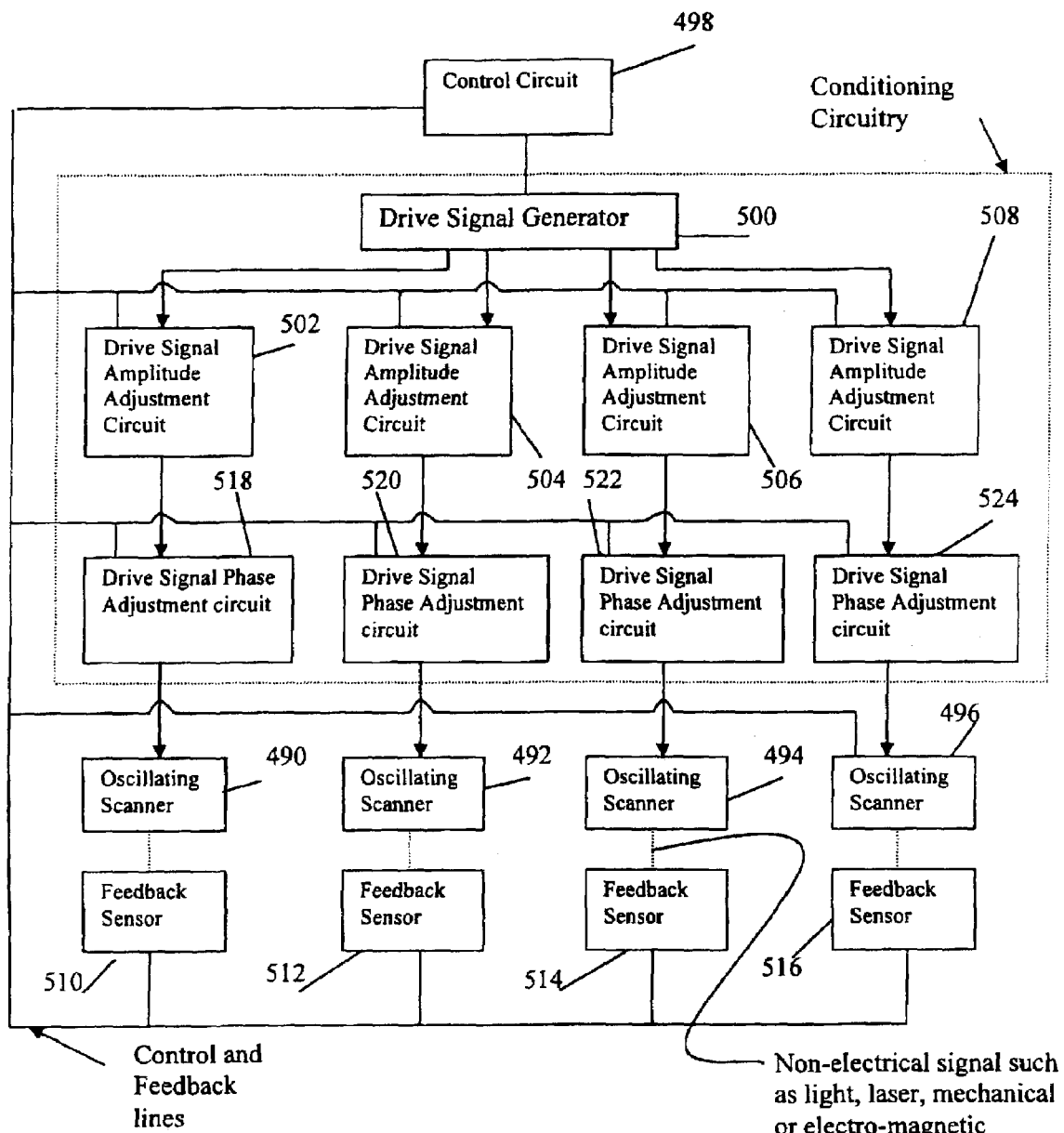
FIG. 36 is a block diagram of a device constructed in accordance with an embodiment of the present invention.

Referring now to FIG. 36, a block diagram for implementing a preferred embodiment of the present invention is shown. The embodiment uses four oscillating scanners 490, 492, 494 and 496 such as would be found in a laser printer that produces color images from three primary colors and black. While four oscillating scanners are shown, it will be readily appreciated that the present invention could be used to synchronize any number of oscillating scanners. The embodiment includes a control circuit 498 that determines the resonant frequency for each oscillating scanner 490, 492, 494 and 496. The control circuit 498 then selects a drive signal frequency based upon the resonant frequencies of the oscillating scanners 490, 492, 494 and 496. The drive signal frequency can be selected in a number of different ways. For example, the drive signal frequency may be selected to be equal to the average or mean of the resonant frequencies of the four oscillating scanners 490, 492, 494 and 496. Selecting the average resonant frequency is beneficial in that it reduces the average of the differences between any single oscillating scanner's 490, 492, 494 and 496 resonant frequency and the drive signal frequency. Alternatively, the drive signal frequency might be selected to be the midpoint between the lowest resonant frequency of any oscillating scanner 490, 492, 494 and 496 and the highest resonant frequency of any oscillating scanner 490, 492, 494 and 496. This type of selection scheme achieves the smallest possible value for the extreme variation between a scanner 490, 492, 494 and 496 resonant frequency and the common drive signal frequency.

Once a drive signal frequency has been selected, a drive signal generator 500 is prompted to produce a drive signal having the selected frequency. The drive signal from the drive signal generator 500 is provided to each of four drive signal amplitude adjustment circuits 502, 504, 506 and 508. The drive signal amplitude adjustment circuits 502, 504, 506 and 508 preferably adjust the amplitude of the drive signal based upon the difference between the resonant frequency of the oscillating scanner to which the drive signal amplitude adjustment circuit corresponds and the drive signal frequency. The purpose of the amplitude adjustment is to insure that the scan amplitudes of the oscillating scanners 490, 492, 494 and 496 are all approximately equal. In alternative embodiments, the amplitude of the drive signal for each oscillating scanner 490, 492, 494 and 496 may be determined by examining the scan amplitude sensed for each oscillating scanner 490, 492, 494 and 496 by an associated feedback sensor 510, 512, 514 and 516. Once the amplitude of the drive signal for each oscillating scanner 490, 492, 494 and 496 is adjusted by the associated drive signal amplitude adjustment circuit 502, 504, 506 and 508, the phase of the drive signal for each oscillating scanner 490, 492, 494 and 496 is adjusted by a drive signal phase adjustment circuit 518, 520, 522 and 524 associated with each oscillating scanner 490, 492, 494 and 496. The phase of the drive signal is adjusted to insure that all of the oscillating scanners 490, 492, 494 and 496 are operating in unison. The phase adjustments can be made based upon a detected operating phase of the oscillating scanners 490, 492, 494 and 496 as detected by the associated feedback sensors 510, 512, 514 and 516. Alternatively, the phase adjustment can be made based upon the difference between the calculated resonant frequency of the particular oscillating scanner 490, 492, 494 and 496, the frequency of the drive signal and the phase relationship discussed above with respect to FIG. 35. Once the phase of the drive signal for each oscillating scanner 490, 492, 494 and 496 has been adjusted by the associated drive signal phase adjustment circuit 518, 520, 522 and 524, the phase and amplitude adjusted drive signals are used to drive the oscillating scanners 490, 492, 494 and 496. The scan amplitude of the oscillating scanners 490, 492, 494 and 496 is detected by the associated feedback sensors 510, 512, 514 and 516. The feedback sensors 510, 512, 514 and 516 may also detect the phase of the oscillating scanners 490, 492, 494 and 496. The information from the feedback sensors 510, 512, 514 and 516 may then be used by control circuit 498 to further adjust the amplitude and phase of the drive signals as needed.

Figure 37:
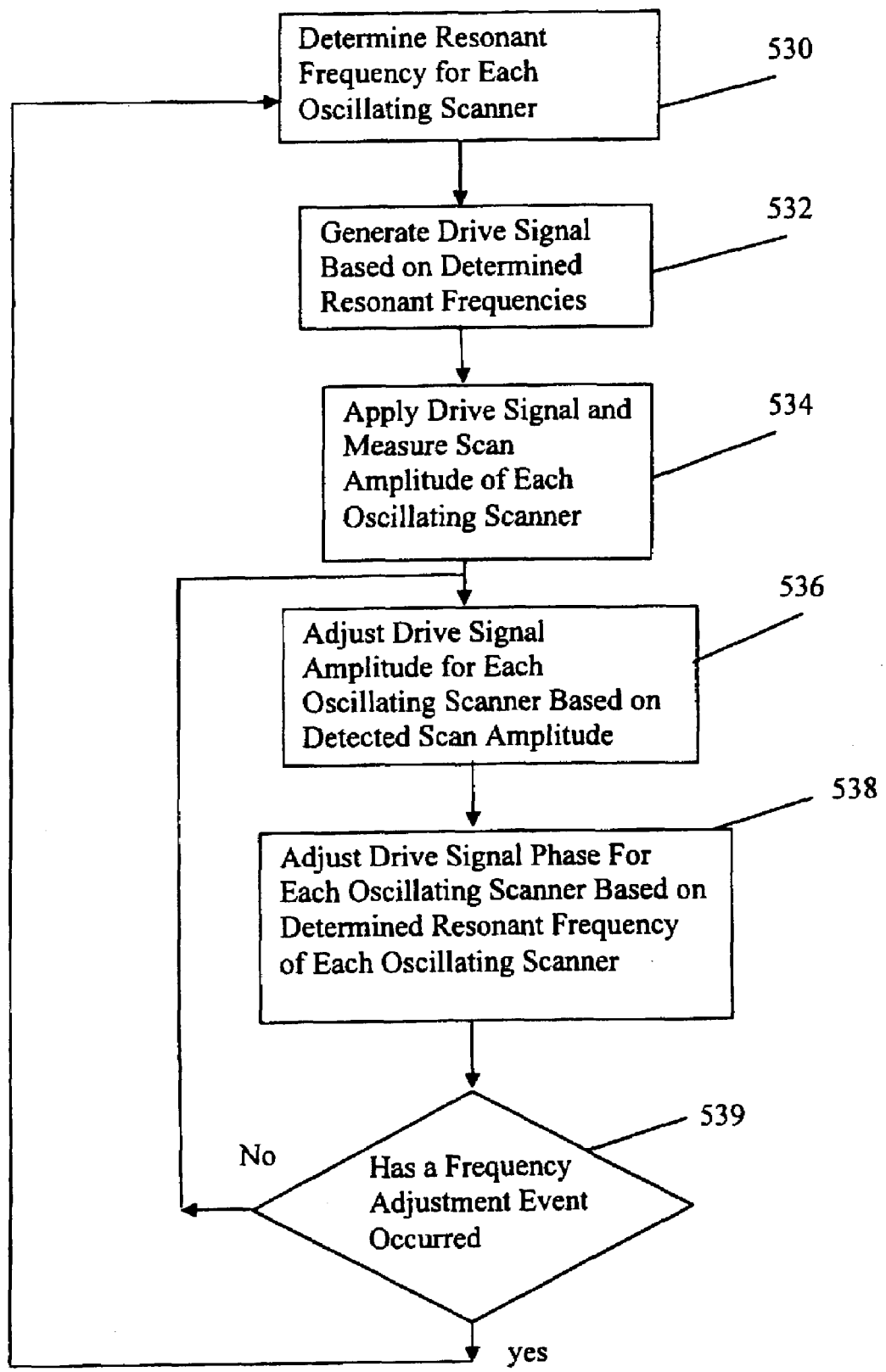
FIG. 37 is a flow chart of a preferred method in accordance with the present invention.

FIG. 37 illustrates a preferred method of ensuring that each of multiple oscillating scanners is operating at the same process speed. The method begins in block 530 by determining a resonant frequency for each oscillating scanner 490, 492, 494, 496. The resonant frequencies can be determined in the manners previously discussed. In block 532, a drive signal for the oscillating scanners is generated based upon the determined resonant frequencies of the oscillating scanners. The drive signal frequency is preferably chosen to be the average of the resonant frequencies of the oscillating scanners. However, any of the previously discussed methods for determining a drive signal frequency based upon the resonant frequencies of the oscillating scanners may be used. Once the drive signal has been generated, the drive signal is applied to the oscillating scanners 490, 492, 494, 496 and the scan amplitude of each oscillating scanner is measured as shown in block 534 using one of the previously described techniques. Drive amplitude may be indirectly determined by measuring t0, t1, t2 or t3 as previously discussed. Since the resonant frequency is the frequency at which the highest scan amplitude is produced for a given drive signal frequency, the scan amplitude for the oscillating scanners should all be less than or equal to the expected scan amplitude at the resonant frequency. All of the oscillating scanners 490, 492, 494, 496 must have a sufficient scan amplitude when operating at the drive signal frequency to perform all required functions such as printing and illuminating feedback sensors 510, 512, 514, 516. Thus, in block 536, the drive signal amplitude for each scanner 490, 492, 494, 496 is adjusted such that the scan amplitude is sufficiently high for every oscillating scanner operating at the drive signal frequency. The amount of amplitude adjustment is achieved based on signals from the feedback sensors 510, 512, 514, 516. In this embodiment, the drive amplitude for each of the oscillating scanners 490, 492, 494 and 496 is adjusted so that each produces the same time interval "t-sensor" (142). Since they are all operating at the same frequency, amplitude will now determine the time t-sensor (142) for each color.

It is also desirable to have the oscillating scanners 490, 492, 494, 496 scanning in phase. However, the oscillating scanners 490, 492, 494, 496 that are operating at a frequency offset from their resonant frequency will experience a phase shift when compared to an oscillating scanner operating at its resonant frequency. Therefore, in block 538, the phase of each drive signal is adjusted based upon the determined resonant frequency of each oscillating scanners 490–496 and the frequency of the drive signal such that all of the oscillating scanners 490–496 are operating in phase. Once the phase has been adjusted, the method moves to block 539 where a determination is made as to whether a frequency adjustment event has occurred. If not, the method returns to blocks 536 and 538 to adjust the amplitude and phase of the drive signals, if needed. If a frequency adjustment event has occurred, the method returns to block 530 and determines resonant frequencies again for the purpose of determining a new drive frequency. Examples of a frequency adjustment event would be a power reset or a determination that one of the drive amplitudes has exceeded a predetermined threshold. The process starting at block 530 is repeated to account for any changes in the resonant frequencies that occur due to environmental factors and the passage of time.

If the oscillating scanners 490–496 are not busy, such as may occur when a printer is not actively printing, the control circuit 498 in FIG. 36 determines resonant frequency for each scanner 490–496 by moving the drive frequency through a range around the expected resonant frequency and determining which frequency creates the greatest scan amplitude. That frequency is the resonant frequency. Alternatively, the control circuit may determine resonant frequency while the oscillating scanners 490–496 are busy, by simply measuring the scan amplitude. Control circuit 498 may calculate a new resonant frequency based upon the newly measured scan amplitude, and the known prior resonant frequency, prior operating amplitude, and currently existing operating frequency. To make this type of calculation, the control circuit must assume that the currently existing operating frequency remains on the same side of the resonant frequency.

The method of FIG. 37 allows oscillating scanners to be used in tandem scanners such as a color laser printer. These oscillating scanners are typically less expensive and complicated than rotating polygonal scanners. Furthermore, the use of multiple scanners operating in tandem allows for improved accuracy in printing while maintaining a high process speed.

The foregoing description of preferred embodiments has been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as is suited to the particular use contemplated. All such modifications and variations are within the scope of the invention as determined by the appended claims when interpreted in accordance with the breadth to which they are fairly, legally, and equitably entitled.

What is claimed is:

1. A device for determining a position and direction of movement of a scanning laser beam reflected from an oscillating reflective device, said device for determining the position and direction comprising:
   a single sensor that produces an output when the scanning laser beam scans across the sensor wherein the sensor is positioned along a scan path of the scanning laser beam in a position to be illuminated twice by the scanning laser beam in a single oscillation cycle of the oscillating reflective device;
   a clock for receiving the sensor output and measuring time intervals between sensor outputs, each of which corresponds to the sensor detecting the scanning laser beam; and
   a processor for determining the position and direction of the scanning laser beam based upon the measured time intervals and stored parameters.

2. The device of claim 1 wherein at least one of the stored parameters corresponds to the position of the sensor along the scan path of the scanning laser beam.

3. The device of claim 1 wherein a drive signal is used to control the oscillation of the oscillating reflective device.

4. The device of claim 3 wherein the processor adjusts the frequency of the drive signal based on the measured time intervals.

5. The device of claim of claim 3 wherein the amplitude of the drive signal is adjusted based upon the measured time intervals.

6. The device of claim 1 wherein the scanning laser beam provides a latent electrostatic image on a light sensitive surface.

7. The device of claim 6 wherein the latent electrostatic image is provided on the surface of a rotating photoconductive drum.

8. The device of claim 1 wherein the position and direction of a single scanning laser beam determined.

9. A laser scanning apparatus comprising:
   a laser producing a laser beam;
   a scanning apparatus for directing the laser beam through a scan path in scan cycles to produce a scanning laser beam having at least first and second travel directions;
   a single sensor positioned in the scan path of the laser beam in a position to be illuminated twice by the laser beam in a single scan cycle, the sensor producing a sensor output when it is illuminated by the laser beam;
   a logic system for:
      receiving the sensor output;
      calculating first and second time intervals based upon the time intervals between the sensor outputs, each of said first and second time intervals corresponding to a time interval between illuminations of the sensor by the laser beam;
      for storing parameters corresponding to a travel direction of the scanning laser beam; and for determining a position and direction of the scanning laser beam based at least in part upon the first and second time intervals.

10. The laser scanning apparatus of claim 9 further comprising a light sensitive surface wherein the scanning laser beam provides a latent electrostatic image on the light sensitive surface.

11. The laser scanning apparatus of claim 10 wherein the light sensitive surface comprises a surface of a rotating photoconductive drum.

12. The laser scanning apparatus of claim 11 wherein the laser scanning apparatus comprises a single laser.

13. The laser scanning apparatus of claim 9 wherein the laser scanning apparatus comprises a single laser.

14. The laser scanning apparatus of claim 9 wherein the laser scanning apparatus comprises a laser printer.

15. The laser scanning apparatus of claim 14 wherein the laser scanning apparatus comprises a single laser.

* * * * *